[72] Inventor Meredith S. Ulstad
Minneapolis, Minn.

[21] Appl. No. 621,050
[22] Filed Mar. 6, 1967
[45] Patented Apr. 6, 1971
[73] Assignee Control Data Corporation
Minneapolis, Minn.

[54] DATA FORMAT CONVERSION AND TRANSMISSION SYSTEM
5 Claims, 18 Drawing Figs.

[52] U.S. Cl. .......... 325/38
[51] Int. Cl. .......... H04b 1/66
[50] Field of Search .......... 325/38, 42, 65, 38 (A), 50; 340/347; 333/20, 28, 70; 332/1

[56] References Cited

UNITED STATES PATENTS

| | | | |
|---|---|---|---|
| 2,629,841 | 2/1953 | Peterson | 333/20X |
| 2,854,641 | 9/1958 | Daguier | 333/70 |
| 2,907,021 | 9/1959 | Woods | 332/1X |
| 2,927,312 | 3/1960 | Piel | 340/347 |
| 2,991,422 | 7/1961 | Yaeger | 332/1 |
| 3,252,093 | 5/1966 | Lerner | 325/42 |
| 3,311,910 | 3/1967 | Doyle | 340/347 |
| 3,383,598 | 5/1968 | Sanders | 325/38X |
| 3,421,146 | 1/1969 | Zegers et al. | 325/42X |
| 3,297,951 | 1/1967 | Blasbalg | 178/69 |
| 3,388,330 | 6/1968 | Kretzmer | 325/42 |
| 3,435,147 | 3/1969 | Malm | 179/15A |

*Primary Examiner*—Robert L. Griffin
*Assistant Examiner*—Anthony H. Handal
*Attorneys*—Paul L. Sjoquist and Joseph A. Genovese

ABSTRACT: The present invention relates to a data format conversion and transmission system which connects digital information from binary input receiving means in multibit quantities by encoding this information into selected analog waveforms, transmitting the waveforms to a receiver and decoding those analog waveforms in the receiver to reproduce the converted digital information.

INVENTOR.
MEREDITH S. ULSTAD
BY Thomas G. Devine
ATTORNEY

SOX (6π, -5.5, t)

VALUE OF COMPONENTS (Ω, f, h)

| COMPONENT | SUBNETWORK 48 (a) | 50 (b) | 52 (c) | 54 (d) | 56 (e) | 58 (f) |
|---|---|---|---|---|---|---|
| $L_1$ | .003912 | .04332 | .1392 | .01065 | .02332 | 0.0 |
| $R_1$ | .004937 | .1049 | .2251 | .02395 | .0530 | ∞ |
| $C_2$ | .7888 | .3497 | .4407 | .4328 | .3615 | .2345 |
| $R_2$ | .002464 | .04535 | .07568 | .01178 | .02787 | 0.0 |
| $R_3$ | 1.211 | .3348 | .2310 | .7306 | .4642 | 1.000 |
| $U_1$ | .6192 | .9428 | +.8033 | .7581 | .8924 | 0.0 |
| $U_2$ | .4030 | .8524 | -1.000 | .03257 | .5657 | 0.0 |
| $U_3$ | -1.000 | -1.000 | +.02897 | -1.000 | -1.000 | 1.000 |

INVENTOR.
MEREDITH S. ULSTAD
BY Thomas G. Devine
ATTORNEY

INVENTOR.
MEREDITH S. ULSTAD
BY Thomas G. Devine
ATTORNEY

Patented April 6, 1971 3,573,621

13 Sheets-Sheet 4

INVENTOR.
MEREDITH S. ULSTAD
BY Thomas G. Devine
ATTORNEY

INVENTOR.
MEREDITH S. ULSTAD
BY Thomas G. Devine
ATTORNEY

INVENTOR.
MEREDITH S. ULSTAD
BY Thomas G. Devine

ATTORNEY

INVENTOR.
MEREDITH S. ULSTAD
BY Thomas G. Devine
ATTORNEY

INVENTOR.
MEREDITH S. ULSTAD
BY Thomas G. Devine
ATTORNEY

INVENTOR.
MEREDITH S. ULSTAD
BY Thomas D. Devine
ATTORNEY

INVENTOR.
MEREDITH S. ULSTAD
BY Thomas J. Devine
ATTORNEY

INVENTOR.
MEREDITH S. ULSTAD
BY Thomas G. Devine
ATTORNEY

INVENTOR.
MEREDITH S. ULSTAD
BY Thomas G. Devine
ATTORNEY

S/Hη
REQUIRED ENERGY
PER BIT DIVIDED
BY NOISE POWER
DENSITY

INVENTOR.
MEREDITH S. ULSTAD
BY Thomas J. Devine
ATTORNEY

DATA FORMAT CONVERSION AND TRANSMISSION SYSTEM

This invention relates to a data format conversion and transmission system (hereafter referred to as transmission system) and more particularly to a method and apparatus for transmitting and receiving frequency bandwidth-limited encoded digital data via a transmission channel.

High speed digital computers are capable of processing data at rates in excess of two and one-half million bits per second. Subsequently at these processing rates, the requirements for interconnecting high speed digital computers by means of transmission systems which allow communication of data at a high bit rate volume and at an extremely low error rate have become critical. Further, a limitation now being imposed on transmission systems is that data must be transmitted within a frequency bandwidth limited spectrum. Previously known systems in the art are capable of transmitting data at rates approaching 2½ million bits per second. However, these transmission systems are incumbered with several disadvantages which include: an unacceptably high error rate which occurs during transmission; a high energy per bit requirement for transmission through a channel with a given noise power density; and the need of a wide frequency bandwidth spectrum during transmission. A further disadvantage is experienced when a complex signal is attenuated and otherwise affected by channel noise of the system, which noise tends to introduce error into the transmission of data.

Attempts in the past have been made to alleviate some of the above disadvantages by specifically designing devices to eliminate or reduce specific disadvantages. These include transmission systems in which data transmission is confined to a narrow frequency band. The narrow frequency bandwidth is accomplished by maintaining an effectively narrow bandwidth occupancy. However, this effectively narrow bandwidth occupancy is dependent upon an interlacing of frequency spectra with that of identical units operating in precisely located adjacent channels. Thus, if the operation of the other dependent unit is not precisely located in an adjacent channel, the frequency bandwidth required for single unit operation is no longer effectively narrow since the use of an adjacent channel by the single unit is still necessary.

Some advanced communication systems have been designed to reduce channel noise error introduced into the transmission of data by automatically adapting the transmission rate of data to the noisiness of the transmission channel. Thus, the digital data is not transmitted at a continuous rate. Particular applications require a communication system with an extremely low error rate of transmission. Under certain design criteria, it becomes impossible or undesirable to: modify a transmitter and receiver; increase the transmitted power; or to decrease the channel noise power spectral density which directly reduces the error rate. The only remaining degree of freedom for reducing transmission error lies in reducing the rate of data transfer which subsequently reduces the volume of data transferred.

However, it is theoretically possible to serially transmit members of an ensemble of waveforms so that each waveform represents several bits of digital information. When one designs a system for the transmission of data, the important parameters considered are the bandwidth, error rate and noise power density. Any data transmission system will have these parameters. Thus, the invention is directed toward an efficient, flexible transmission system in which the parameters are employed in combination such that when one parameter has a restriction or limitation imposed thereon, the other parameters become compensated in a relationship to provide efficient operation in terms of theoretical limits.

It is therefore an object of this invention to set forth a transmission system which utilizes an encoder and decoder as a part of a system for transmitting data at a high bit rate, coupled with a low error rate.

Another object of this invention is to provide a transmission system wherein the transmission of data is accomplished with a low value of energy per bit at a specified error rate and specified noise power density.

Yet another object of this invention is to provide a transmission system which is capable of operating within a narrow frequency bandwidth.

A further object of this invention is to provide a transmission system which is capable of transmitting data at a continuous rate while maintaining a specified error rate.

A still further object of this invention is to provide a component which has a relatively large time delay-bandwidth product in terms of the number of R–L–C elements used therein.

Yet a still further object of this invention is to provide a basic subassembly comprising nonideal components which can be combined to form efficient, flexible transmission system units capable of cooperating with a wide variety of digital sources, uses and transmission rates.

These and other objects and the entire scope of the invention will become more fully apparent when considered in light of the following detailed description of an illustrative embodiment of this invention and from the appended claims.

Briefly, the transmission system utilizes a digital data encoder-transmitter to receive an input signal of digital data. Thereafter, the input signal is encoded into a waveform having a plurality of sample points corresponding to and representative of the digital data. The encoder-transmitter is electrically coupled to a transmission channel which receives the waveform. The transmission channel propagates the received waveform over its channel. A receiver-digital data decoder is electrically coupled to the transmission channel to receive the propagated waveform. The receiver-decoder correlates the plurality of sample points of the received wave. Thereafter, the output from the receiver decoder is an output signal of digital data conforming to the digital data applied as an input to the data transmission system.

Figure 1A:
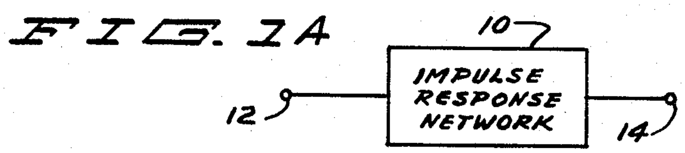
FIG. 1A is a block diagram illustrating a typical impulse response network, which is the basic network associated with the transmission system of the invention.
Figure 1B:
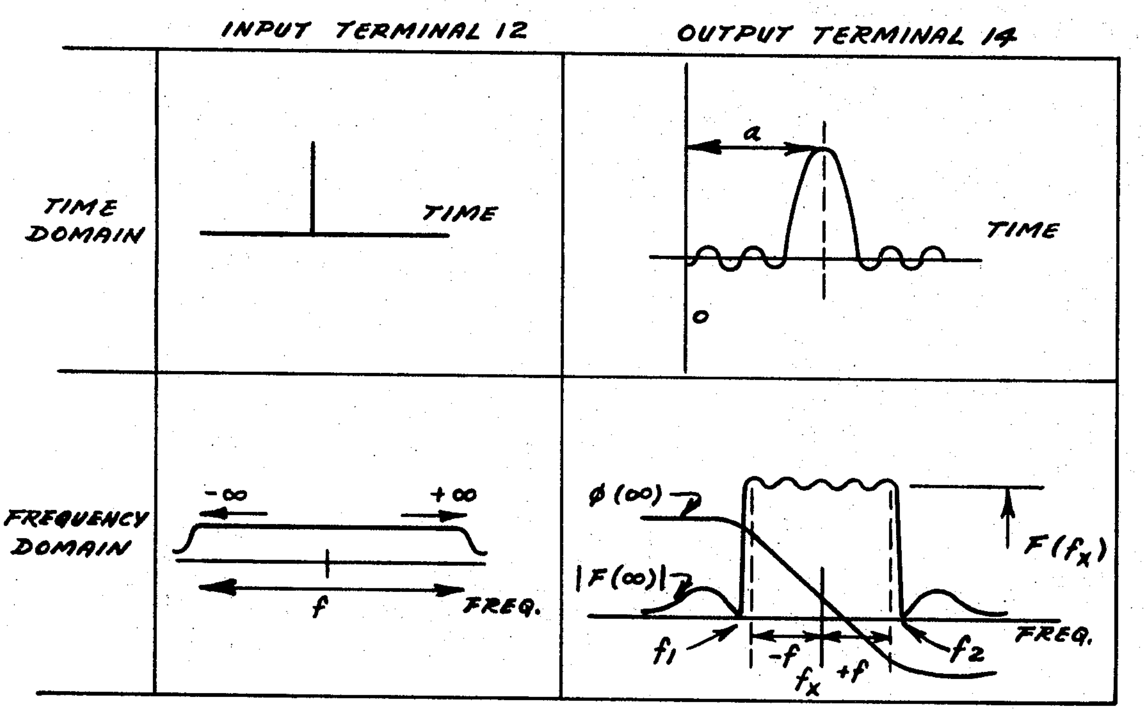
FIG. 1B is an illustration of typical input and output waveforms associated with the impulse response network of FIG. 1A.

Before proceeding with the description of the transmission system as a whole, the impulse response network, the synthesizing subnetworks and the matched filter arrangements which comprise the basic components thereof will be described. The basic impulse response network is shown in FIG. 1A. The impulse response network 10 has a single input terminal 12 and a single output terminal 14. The impulse response network 10 is unique with respect to its output response which is produced on the output terminal 14. Referring now to FIG. 1B, which illustrates the waveforms associated with the impulse response network of FIG. 1A. For purpose of definition, an impulse is a unidirectional pulse of short duration. The absolute magnitude of its Fourier transform, that is its frequency domain spectrum, is essentially constant over the range of frequencies for which the impulse response network is used for transmission. If any impulse function having the time domain characteristic and the frequency domain characteristic of the input pulse shown in FIG. 1B is applied to input terminal 12, an output signal from the impulse response network 10 will be produced at output terminal 14. Of importance is the waveform of the output signal in the time domain and in the frequency domain. The waveform in the time domain has its maximum amplitude at a time *a*. The frequency domain output waveform an the time domain output waveform will be discussed in detail hereinafter.

Referring to the frequency domain representation. The output waveform occupies a frequency bandwidth of ($f2$—$f1$) cycles. The frequency limits $f1$ and $f2$ are very well defined. At the frequency limit $f1$, the magnitude of the transform abruptly increases from nearly zero to approximately F ($f_x$). At the frequency limit of $f2$, the wave form decreases sharply from approximately F($f_x$) to nearly zero. The envelope of this waveform is very nearly rectangular in shape. This rectangular waveform is very important in that a precisely determined bandwidth of ($f2$—$f1$) cycles is utilized. Further, a second similarly shaped waveform can occupy an adjacent channel, either commencing at the frequency limit $f2$ or terminating at the frequency limit $f1$. This rectangular shaped waveform thus provides efficient use of a transmission channel because a narrow and limited frequency bandwidth of ($f2$—$f1$) cycles is utilized, and also because another waveform can be packed adjacent to this waveform without cross-interference.

In other encoding systems, it is found that the output response waveform in the time domain is square or rectangular shaped. Similarily, the frequency domain representation has by necessity an output waveform with an envelope similar to the output time domain of the instant case. The disadvantage of a frequency domain representation having characteristics similar to those of the time domain in the instant case is that a fairly broad frequency bandwidth is necessary to include all the necessary components associated with that frequency domain waveform. Thus, efficient use of a transmission channel is decreased because adjacent signals cannot be packed into close physical proximity with each other.

Nyquist has shown that the theoretical minimum bandwidth which can be utilized to transmit impulses at fixed time intervals is related to these intervals by the expression:

$$B_{\text{min.}}=\frac{1}{2T}$$

In the above expression, *B* min is the theoretical minimum bandwidth and *T* is the time between impulses. See, for example, the book entitled "Data Transmission" by Bennett and Davey, beginning on page 53.

Now referring specifically to the time domain output wave as set forth in FIG. 1B, this wave can be approximated by the following equation:

(1)

$$Sox\ (u,v,t)=\frac{\sin\ u(t-a)}{u(t-a)}[U_1(t)-(1-e^v)U_1(t-2a)]$$

where the function $U_1t)$ is representative of a step function and is 0 when *t* is less than 0 and is 1 when *t* is equal to or greater than 0.

Figure 4A:
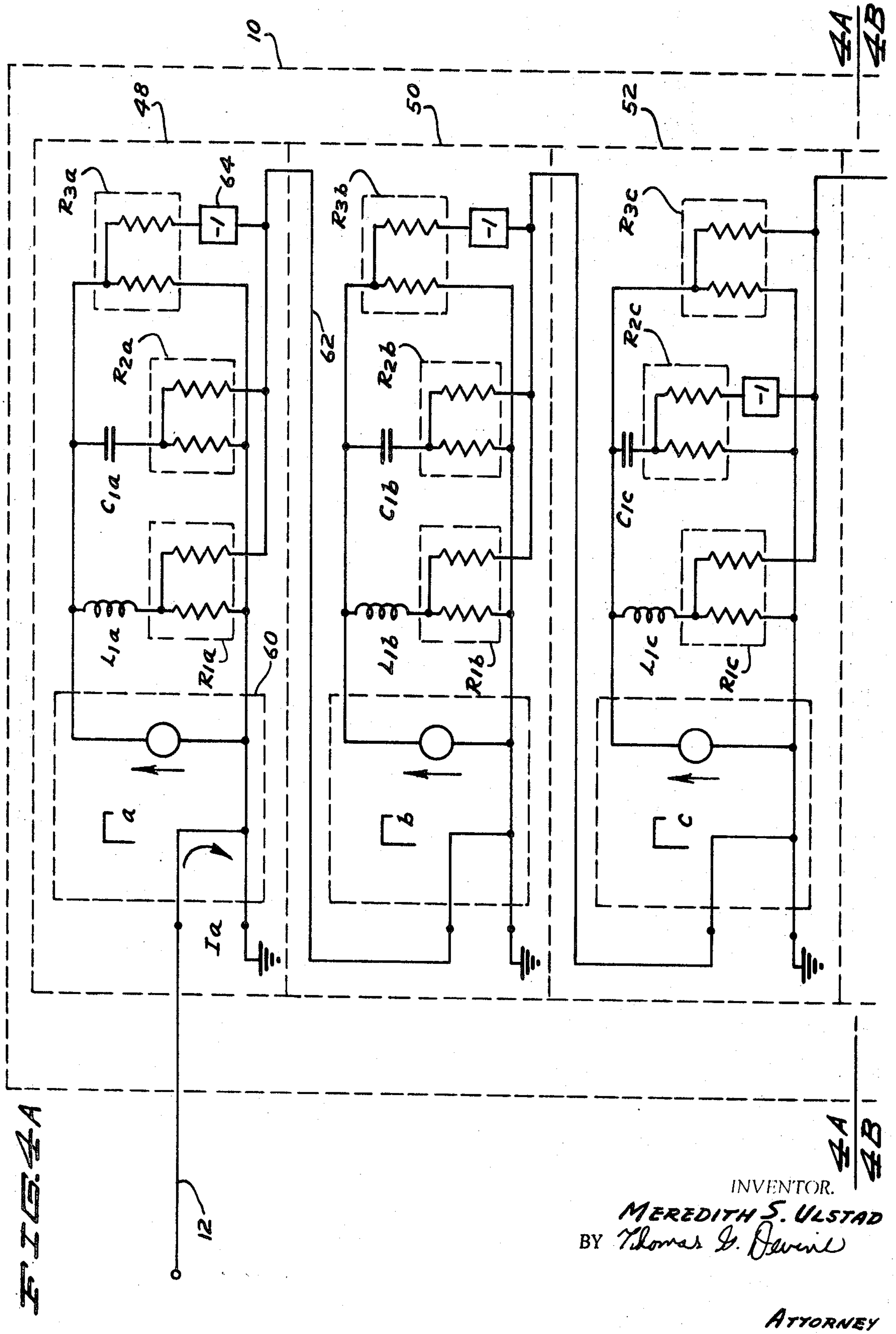
FIGS. 4A and 4B are schematic diagrams of a typical impulse response network illustrating the arrangement of the associated synthesizing networks.
Figure 4B:
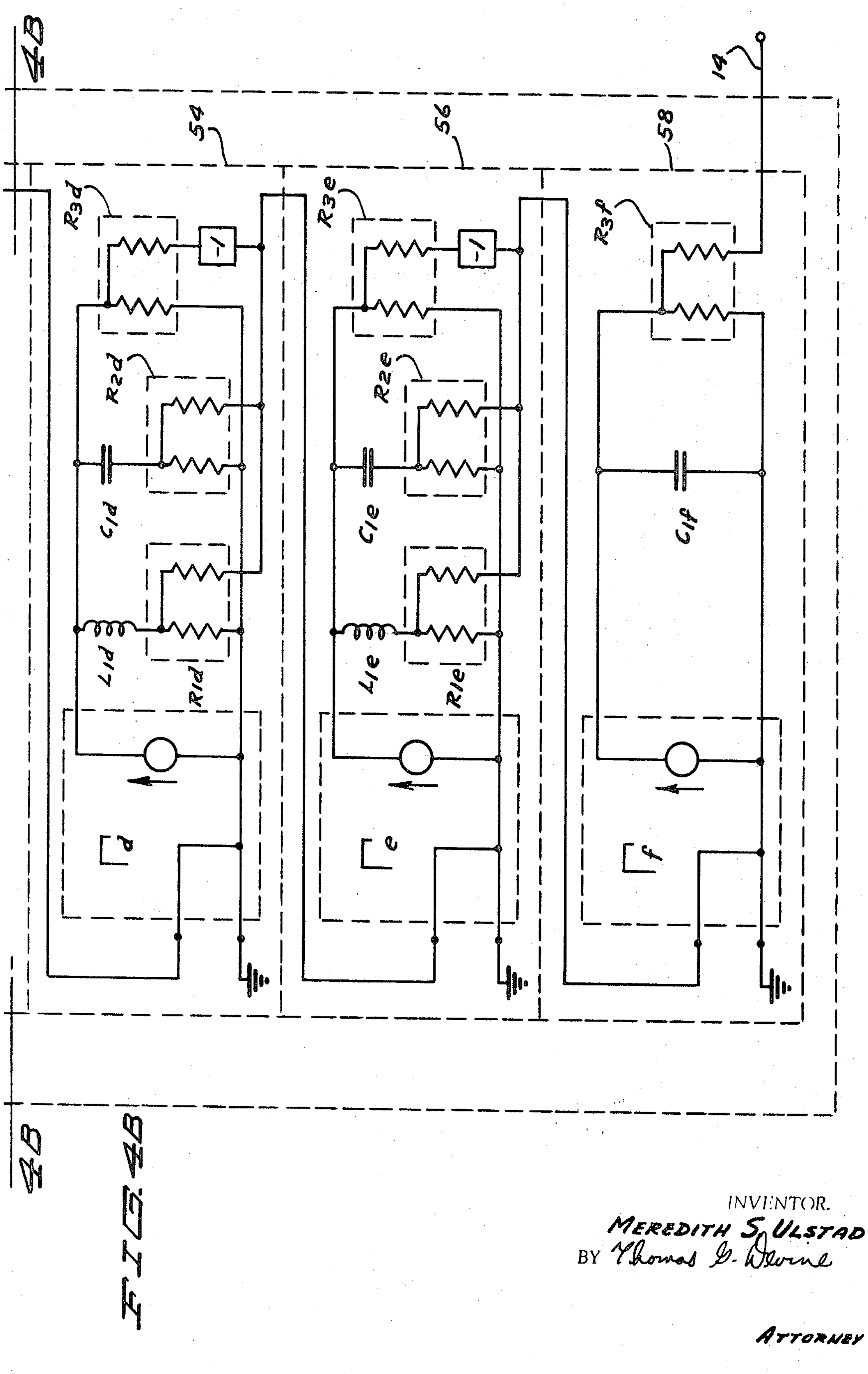

Equation (1) is essentially a variation of the basic function sin *x*/*x*. This basic function is utilized in mathematical models of communication systems because it permits the determination of performance limits in terms of the pertinent quantities associated with the mathematical model. However, prior art has disclosed that attempts have been made to make an electrical network having an output response in the time domain which is a close approximation to the sin *x*/*x* function. For example, see an article entitled "An Introduction to Matched Filters," by George L. Turin, which appeared in the Jun., 1960, IRE Transaction on Information Theory, specifically pages 311 to 320. Generally, this article discusses the subject of a matched filter, which is of interest to this invention. At this point, it is well to set forth that the impulse network 10 now being described will be combined in a certain predetermined method to make a matched filter as illustrated in FIG. 4 which will be described in detail hereinafter. Consequently, the definition of a matched filter as set forth on page 311 of the above article by Turin is important.

The major consideration of the impulse response network 10 is its characteristic of producing a time domain output response which has maximum amplitude at time *a* as shown in FIG. 1B. This output response, as approximately expressed in equation (1), is dependent on the variables *u*, *v*, and *t*. Thus, the function expressed by equation (1) shall hereinafter be denoted as Sox (*u*, *v*, *t*).

Considering the output frequency domain wave of FIG. 1B. The ideal frequency domain wave would, of course, be rectangular shaped. However, when electrical networks are designed to provide an output impulse response, it becomes necessary from a practical and engineering viewpoint to approximate the ideal response. This approximation is obtained by a combination of electrical components into an electrical network in which the error between the actual and ideal impulse responses are minimized. In this invention, the basic component of the transmission system is the impulse response network. The impulse response of this network approaches very nearly the ideal waveform and its associated spectrum of the Sox (*u*, *v*, *t*) function in the time domain and frequency domain respectively. Also of importance is the design simplicity of the plurality of synthesizing subnetworks which are combined to make the impulse response network 10.

As a special example of an attempt made to obtain approximations to the Sox (*u*, *v*,*t*) function in the time domain, see for example a report by J. M. Wozencraft entitled "Application of Sequential Decoding to High-Rate Data Communication on a Telephone Line" which appeared in the IEEE Transaction on Information Theory, Apr., 1962. The above reference sought approximations to equation (1) with $u=8\pi$.

To best understand the method utilized to finally implement the impulse response network, it will be helpful to review generally the network theory application to waveforms associated with the time domain responses of linear, time invariant networks.

Generally, if a linear, time invariant, lumped parameter network is driven by an impulse function input signal, the output waveform includes functions of the form:

(2) $$F_1(t)=\Sigma_i A_i e^{M_i t}+\sum_j e^{N_j t}(B_j\cos C_j t+D_j\sin C_j t)$$

The functions of equation (2) can be transformed using Laplace transforms to yield an expression of the form:

(3) $$F_1(s)=\frac{\Sigma A_i}{i_{s-M_i}}+\frac{\Sigma B_j s+C_j}{js^2+D_j s+E_j}$$

This partial fraction expansion can be consolidated to a fraction of the form:

(4) $$F_2(s)\frac{\sum_k C_k s^k}{\sum_m D_m s^m}$$

Thereafter, by use of equation (4) a network realization for the equation can be designed, the basic assumption, however, being that only simple pole solutions for the equation exist.

Now referring again to equation (1). A Laplace transform of equation (1) can be made quite easily. However, difficulty is encountered in that the transform cannot ultimately be reduced to the form of equation (4). By using "building block " functions of the form of equation (2), a network having approximately the response of equation (1) and having a transfer function of the form of equation (4) can be realized. This is the basic approach employed in the design of the impulse response network. In equation (2), the various constant quantities are the unknowns to be determined in the case of linear networks. The quantities $M_i$, $N_j$ and $C_j$ determine the location of poles of the network transfer function. The other quantities $A_i$, $B_j$ and $D_j$ determine the contribution which the individual poles make to the approximation. The basic approach includes estimating a particular location for the poles $M_i$, $N_j$ and $C_j$, and then determining the proper weight which should be assigned to them. This requires the solution of $n$ linear equations in the $p$ unknowns $A_i$, $B_j$ and $D_j$. These calculations are repeated while the pole locations as represented by $M_i$, $N_j$ and $C_j$ are perturbed cyclically. This process of calculation is continued until a solution is obtained wherein a minimum error is obtained utilizing a minimum number of poles to a solution. This solution was obtained on a CONTROL DATA 1604 DIgital Computer. When the number of poles and their associated $p$ coefficients were determined, a time domain expression in the form of equation (2) was written based upon their determined value. Thereafter, a partial fraction expansion corresponding to the Laplace transform of the time domain expression was obtained. Subsequently, an electrical network which shall hereinafter be referred to as a synthesizing subnetwork, comprising linear nonideal components, was designed to synthesize the poles. By proper interconnection of several synthesizing subnetworks, an impulse response network having an output response as described by equation (1) was designed.

Figure 2:
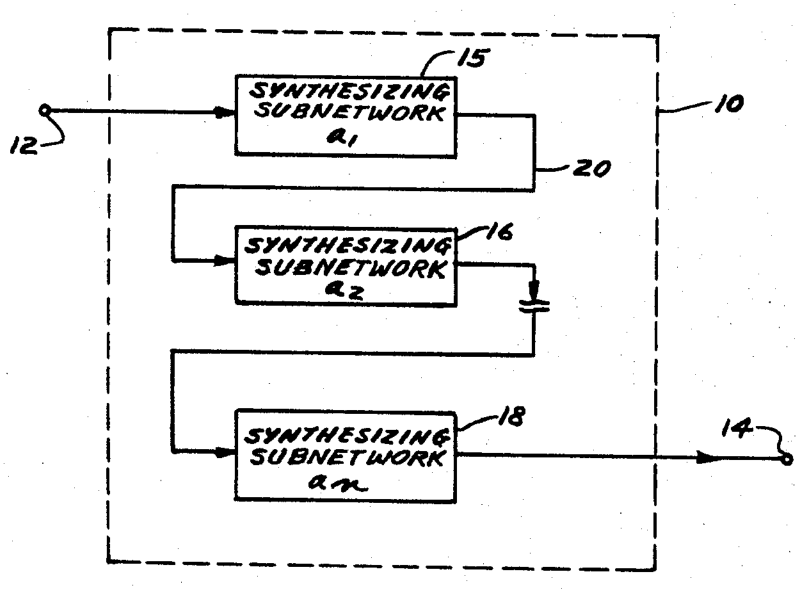
FIG. 2 is a block diagram illustrating the synthesizing subnetworks which form the impulse response network of FIG. 1A.

Considering now the block diagram of an impulse response network of FIG. 2. This impulse response network basically comprises a plurality of $n$ synthesizing subnetworks as for example subnetworks 15, 16 and 18. The number of synthesizing subnetworks necessary in an impulse response network is dependent upon the number of poles selected in approximating equation (1). If a large number of poles are selected, a close approximation between the ideal and actual network can be obtained. This, unfortunately, would result in a fairly complex electrical synthesizing circuit. When the number of poles have been selected yielding an acceptable approximation, an electrical synthesizing circuit can be designed which will produce the poles and the associated zeros necessary to produce the impulse output response.

The synthesizing subnetworks 15, 16, and 18 are designed such that each produces an exponentially decaying sinusoidal output response at a predetermined frequency. The synthesizing subnetworks are connected in series providing superposition of the subnetwork outputs. The final impulse output response from impulse network 10 which appears on output terminal 14 is the algebraic product of the individual synthesizing subnetwork outputs.

Figures 3, 5:
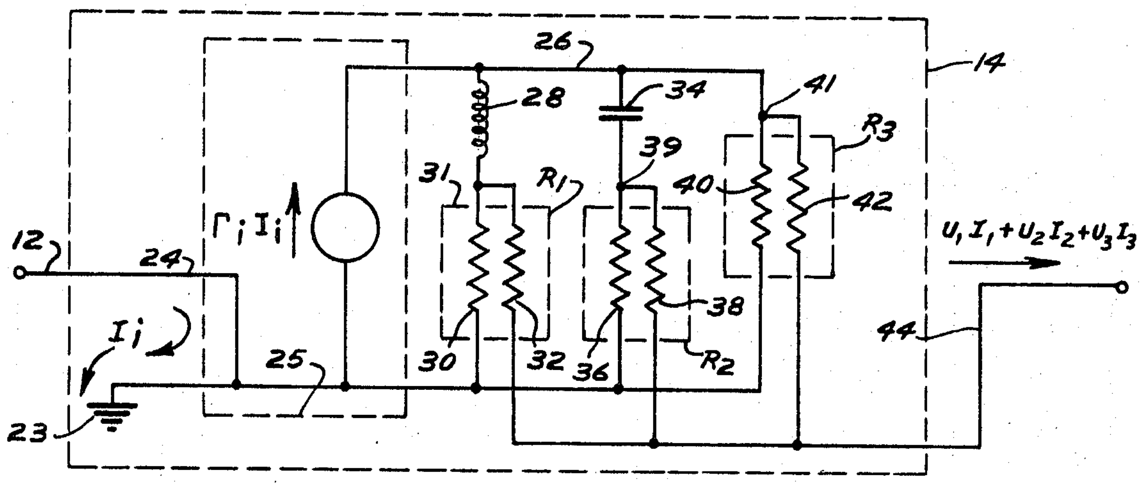
FIG. 3 is a schematic diagram of a single synthesizing subnetwork associated with FIG. 2.
FIG. 5 is a chart illustrating per unit values of components which provide an embodiment of a typical impulse response network with its associated synthesizing subnetworks.

FIG. 3 shows schematically an electrical circuit realization for one synthesizing subnetwork. In selecting linear nonideal components and in designing the electrical circuit, several other variables must be considered. These include: (a) how many poles and zeros is a synthesizing subnetwork to represent; (b) how many synthesizing subnetwork components are necessary; (c) what must be the frequency scaling of the output of each synthesis subnetwork and; (d) how much of the output response of each subnetwork should be utilized. When the above variables are resolved, an electric circuit realization such as illustrated in FIG. 3 may be designed. The synthesizing subnetwork of FIG. 3 provides an output response necessary to satisfy two poles and two zeros in the solution the equation (1).

For purposes of an example, synthesizing subnetwork 15, as shown in FIG. 3, will be described in detail. THe synthesizing subnetwork 15 has an input terminal 12. The input terminal 12 is connected to an input 24 of a current amplifier 25. This current amplifier may be a transistor or any other type of current amplifier known in the art. The current amplifier output 26 is electrically connected in parallel to a first, a second, and a third shunt path, which paths are electrically connected in parallel with respect to each other. The first shunt path comprises a resistance 30 and an inductance 28 connected in series. A resistance 32 is connected between resistance 30 and inductance 28 at connecting point 31. The other end of resistance 32 is connected to output line 44. The impedance of resistances 30 and 32 in parallel shall be designated as $R_1$. The second shut path has a capacitance 34 in series with a resistance 36. This second shut path is in parallel with the first shunt path and in parallel with the current amplifier 24 via output 26. A resistance 28 is connected between resistance 36 and capacitor 34 at connecting point 39. The other end of resistance 38 is connected to output line 44. The impedance of resistances 36 and 38 in parallel shall be designated as $R_2$. The third shunt path has a resistance 40. This third shunt path is in parallel with the second shunt path, the first shunt path, and the current amplifier 24 via output 26. A resistance 42 is connected between output 26 and resistance 40 at connecting point 41. The other end of resistance 42 is connected to output line 44. The impedance of resistances 40 and 42 in parallel shall be designed as $R3$. The output line 44 is then utilized as the input to the subsequent stage. The input circuit of a subsequent stage is identical with that of subnetwork 15.

The operation of this synthesizing subnetwork can be understood by assuming an input current of $I_i$is applied to input 12 of subnetwork 15. This input signal could either be an input pulse applied to the impulse response network, if subnetwork 15 is the first of the series, or the input signal could be an output signal from a prior synthesizing subnetwork. The input 12 applies the input signal having a current of $I_i$ to the input 24 of the current amplifier 25. The current amplifier amplifies the input signal and produces current of $_iI_i$ on output line 26. This current then divides into branch currents as follows; $I$ through the first shunt path, $I_2$ through the second shunt path, and $I_3$ through the third shunt path. The impedances of each shunt path determine what portion of each branch circuit is to be delivered to the output 44. Thus, the current delivered to the output 44 by each shunt circuit is proportional to a shunt path constant, which constant may be denoted as $U$. The constant for the first shunt path would be $U_1$ and the current delivered to output 44 from shunt path one would be $U_1\ I_1$. Similarily, current from shunt path two would be $U_2I_2$ and current from shunt path three would be $U_3I_3$. The final currents algebraically summed by and appearing upon output 44 would be:

$U_1I_1+UI_2+_3I_3$

Since the constants $U_1$, $U_2$ , and $U_3$ may be negative, the synthesizing subnetworks must have provisions for providing electrically a negative constant. This may be accomplished by adding an amplifier having a −1 gain in series with the resistances connected between the individual shunt paths and the grounded output line 44. As an example, the end of resistance 32 which is connected to output line 44 may be applied as an input to an amplifier having a −1 gain. Then the output of that amplifier would be connected to the output line. This is not shown since this would be apparent to one skilled in the art.

Thereafter, a portion of the amplified current pulse will be diverted through each shunt path in proportion to the shunt path impedance. Each shunt path will transform the diverted current as it is conducted through the path. The precise amount of transformation of the amplified current pulse by each shunt path is a function of the electrical characteristics of the elements in the shunt path.

Now that the basic synthesizing subnetwork has been described, consideration should be given as to how this subnetwork is utilized in an impulse response network, the function of the synthesizing subnetwork, and typical values associated with the components in a typical embodiment.

FIG. 4 is an example of an embodiment of an impulse response network, illustrating schematically, an arrangement for producing a time domain impulse response closely approximating Sox ($6\pi$, $-5.5$, $t$). This Sox ($u$, $v$, $t$) function was selected because it was found that this time domain impulse response provided a workable wave for use with the transmission system. However, any Sox ($u$, $v$,$t$) function can be utilized within this transmission system and any Sox ($u$,$v$,$t$) function selected is merely a matter of design choice. The solution to this Sox ($6\pi$, $-5.5$, $t$) function was obtained on the basis of the calculation methods discussed hereinbefore. The solution of this equation, using Laplace transform, resulted in eleven (11) poles and ten (10) zeros. Impulse response network 10, as illustrated in FIG. 4, comprises six synthesizing subnetworks: 48, 50, 52, 54, 56 and 58. Subnetworks 48, 50, 52, 54 and 56 each provide responses for two poles and two zeros. Subnetwork 58 by necessity only provides response for one pole. Input terminal 12 is electrically connected to apply the input signal having a current of $I_2$ to the input of the current amplifier 60. The output line 62 form subnetwork 48 is applied as the input to subnetwork 50. Thereafter, the final Sox ($6\pi$, $-5.5$, $t$) time domain response will appear at output terminal 14.

FIG. 5 is a chart which illustrates per unit value of components within each synthesizing subnetwork for producing this response.

Referring specifically to synthesizing subnetwork 48 of FIg. 4 and to the chart of FIG. 5. The components have the unit value of ohm, farad, or henry. In each shunt path are parallel resistances. The parallel resistances were to have a value of $R_1$ for the first shunt path, $R_2$ for the second shunt path, and $R_3$ for the third shunt path. Thus, in subnetwork 48, $R_1$, $R_2$, and $R_3$ values are determined. It is a matter of design choice as to the proper selection of resistance values for providing current to output line 62. The capacitance of the second shunt path is stated in farads. Realizing that this unit value is impractical, the purpose of denoting this unit will become apparent from the following discussion. The inductance of the first shunt path is stated in henries. The constants $V$ for each path are also important. For example, constant $U_3$ for the third shunt path of subnetwork 48 is negative. The resistance between the third shunt path and the output line 62 is connected in series with an amplifier 64 which provides a $-1$ current gain to fulfill this requirement. Thus, the relative values of the components and shunt path constants have been established. The remainder of the synthesizing networks have elements and provision similarily corresponding to the chart of FIG. 5. These component values may be scaled to any desired impedance level and frequency range by well-known methods.

The impulse response of FIG. 1A in the time domain is the time domain function of the embodiment of FIG. 4. The time delay denoted as $a$ is a variable which influences the selection of synthesizing subnetwork components. Thereafter, a scaling factor denoted as $U$ is determinable by the formula:

$$u=\frac{6\pi}{a}$$

Referring to the frequency domain output response, the maximum value of F($f$) is:

$\frac{1}{2}u$

Also the upper frequency $f_1$ is:

$f_1=u/2\pi$

While the lower frequency $f_2$ is:

$f_2=-u/2\pi$

Thus, it becomes apparent that a variety of frequency spectra and time scales are available through the appropriate choices of Sox ($u$,$v$, $t$).

Figure 6:
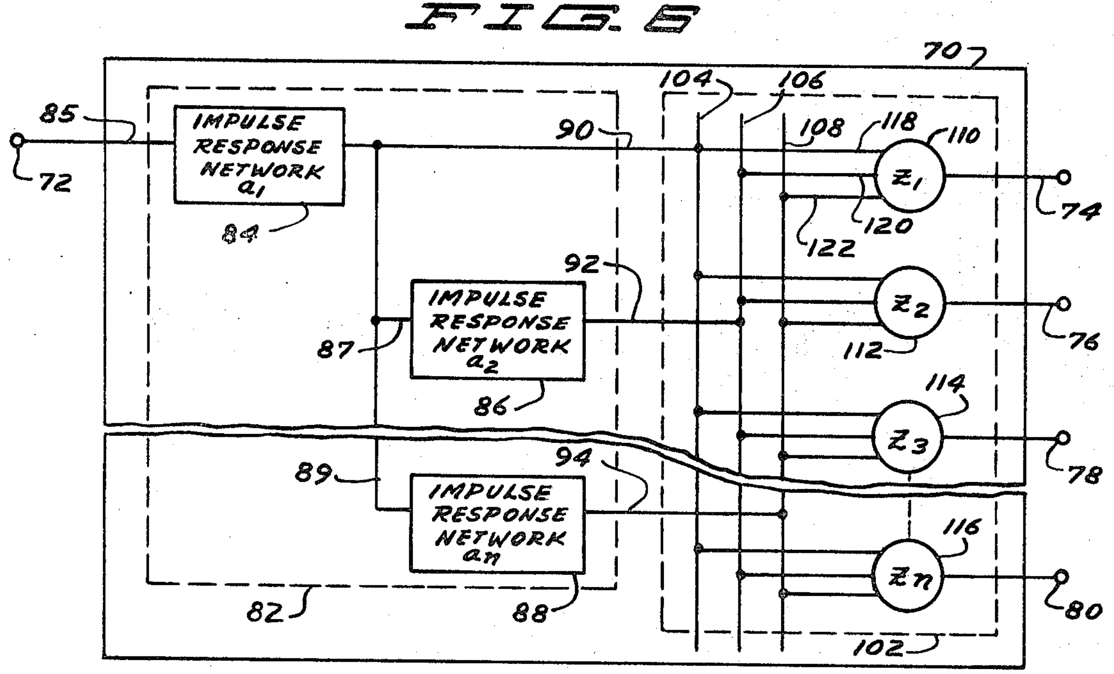
FIG. 6 is a block diagram which illustrates a typical matched filter used for encoding and decoding digital data.

FIG. 6 is a schematic illustrating an arrangement incorporating the impulse response network into a matched filter 70. A matched filter, by definition in the prior art, is a filter having a single input and a single output. In this discussion, a matched filter is to be defined as a filter having either a single input and a plurality of outputs or a plurality of inputs and a single output. This expanded definition of a matched filter is allowable since the single input any one of the plurality of outputs, or conversely, any one of the plurality of inputs and the single output may be combined to provide the single input and single output to fulfill the known definition in the art. A typical matched filter 70 has a first terminal 72 and a plurality of second terminals 74, 76, 78 and 80, the number of second terminals being a design choice. It is apparent that the first terminal 72 may be treated as either an input or an output of the matched filter 70, and the second terminals 74, 76, 78 and 80 may be treated as outputs or inputs correspondingly. The matched filter 70 comprises two sections; an impulse response network encoder section 82 and a weighting impedance section 102. The impulse response network encoder section 82 includes a plurality of impulse response networks connected in parallel, for example 86 and 88. These networks are connected in series to another impulse response network, for example 84. The number of impulse response networks in the matched filter is merely a design choice. Each impulse response network is electrically connected to the weighting impedance section 102 via their respective lines 90, 92 and 94. Considering the matched filter 70 as having input terminals 74, 76, 78 and 80, and output terminal 72, impulse response networks 84, 86 and 88 each have an output line identified as 85, 87 and 89 respectively. Output lines 87 and 89, from impulse response networks 86 and 88 are connected to the input line 90 of impulse response network 84. Output line 85 of network 84 is subsequently connected to terminal 72.

Referring to the weighting impedance section 102, common terminating lines 104, 106 and 108 are provided for establishing the electrical connections between sections. Thus, input line 90 to impulse response network 84 is connected to line 104; input line 92 to impulse response network 86 is connected to line 106; and input line 94 to impulse response network 88 is connected to line 108. Emanating from lines 104, 106, and 108 are a plurality of weighting impedances 110, 112, 114 and 116, each connected in parallel. The weighting impedance may comprise active, passive, or a combination weighting active and passive elements. Each weighting impedance is connected to lines 104, 106, and 108 by a plurality of connecting lines. As a typical example, refer to weighting impedance 110. Connecting line 118 electrically connects terminating line 104 to impedance 110; connecting line 120 electrically connects terminating line 106 to impedance 110, and connecting line 122 electrically connects terminating line 108 to impedance 110. The other weighting impedances are similarily connected to the terminating lines. The function of the terminating lines 104, 106 and 108 is to provide a means for electrically connecting the impulse response network section and the weighting section. Thus, any methods known in the art for electrically connecting electrical elements may be utilized. Subsequently, each weighting impedance is connected to a second terminal. Weighting impedance 110 is connected to 74; weighting impedance 112 is connected to 76; weighting impedance 114 is connected to 78; and weighting impedance 116 is connected to 80.

The operation of the matched filter is dependent upon the time domain characteristics of the individual impulse response networks. The impulse response networks in the impulse response network encoder section 82 are arranged such that network 84 has the longest time domain response, and consequently the most limited frequency bandwidth. It is this impulse response network which determines the frequency bandwidth. Each subsequent impulse response network has a shorter time domain response, and consequently, a wider frequency bandwidth. The last impulsive response network has the shortest time domain response and the widest frequency bandwidth.

Figure 7:
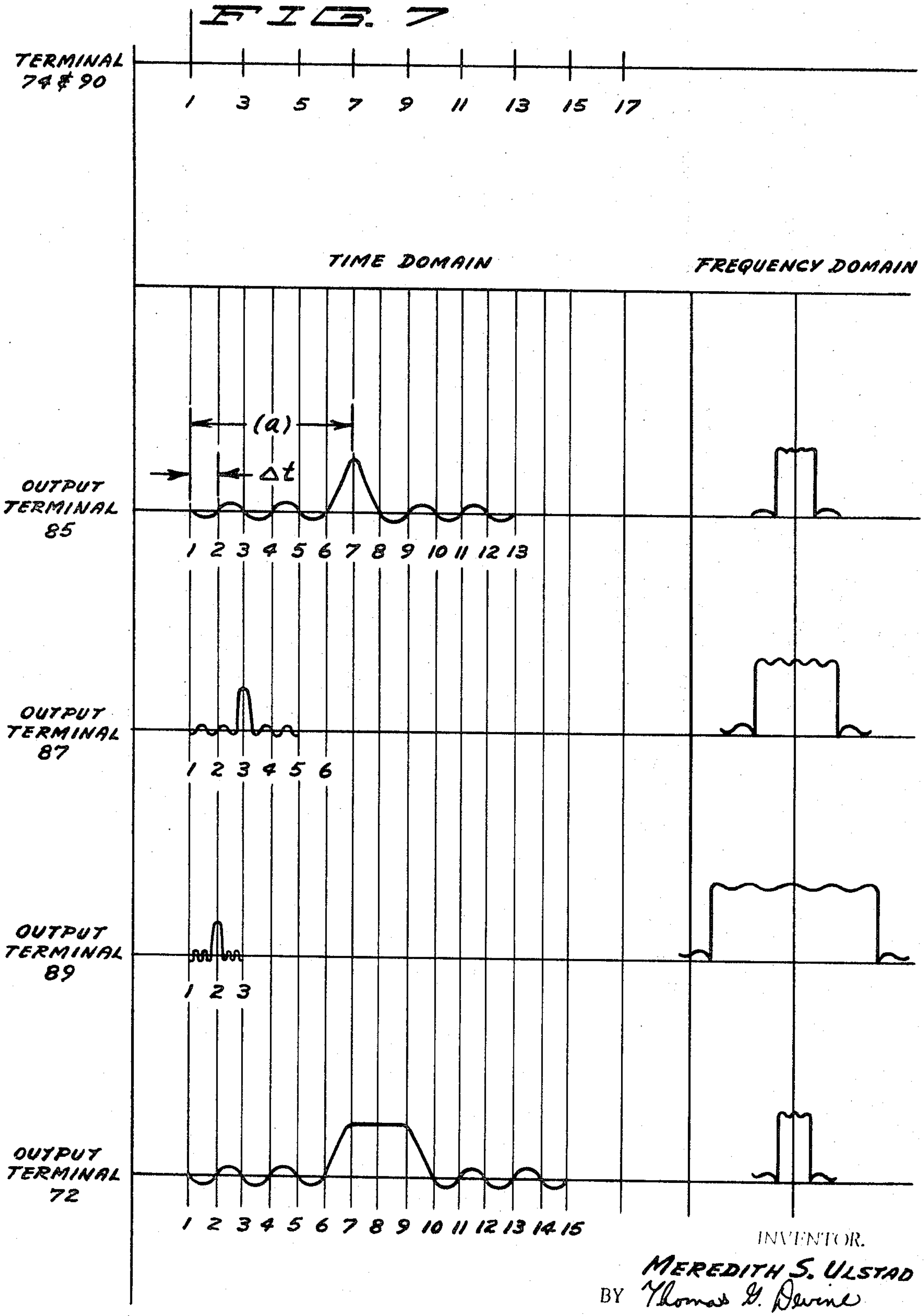
FIG. 7 is a graph illustrating typical waveforms from the matched filter of FIG. 6.

It would be advantageous to consider the operation of the matched filter utilizing a simple example. During the explanation, reference will be made to FIG. 7, which is a graph illustrating typical waveforms from the matched filter of FIG. 6. Assume that each terminal 74, 76, 78 and 80 represents binary digital data; for example, 74 represents a 00, 76 a 01, 78 a 10, and 80 a 11. Assume that terminal 74 is selected via a selection scheme such as a coded resistor matrix or other system known in the art. Assume after the selection is made, an impulse function is applied to terminal 74. The impulse function would have a waveform as illustrated in FIG. 7 for terminal 74. For the purpose of example, assume that the impulse occurs at $t=1$. The time scale is not normalized, but is scaled for purpose of example. This impulse would be applied to weighting impedance 110. The weighting impedance can be designed to weight the impulse signals, producing either a positive or a negative amplitude. For example, assume that the weighting impedance weights the impulse function, applying a unit positive pulse in connecting lines 118, 120 and 122. Line 118 will apply the positive impulse function to input line 90 of impulse response network 84 via connecting line 104. Line 120 will apply the impulse function to input line 92 of impulse response network 86 via connecting line 106. Line 122 will apply the impulse function to input line 94 of impulse response network 88 via connecting line 108. The assumption is made that the plurality of impulse functions will be applied to the individual impulse response networks simultaneously at $t=1$.

Impulse response network 84 will have an output response in the time domain as illustrated by the waveform in FIG. 7 entitled output terminal 85. Impulse response network 86 will have an output response in the time domain as illustrated by the waveform in FIG. 7 entitled output terminal 87. Impulse response network 88 will have an output response in the time domain as illustrated by the waveform in FIG. 7 entitled output terminal 89.

Referring to the waveform of network 84 illustrated as output terminal 85 in FIG. 7, $\Delta t$ shall be defined as the increment of time between points where the waveform crosses the axis. Thus, the waveform of network 84 has a $\Delta t$ time unit. Network 84 is designed to delay the peak amplitude six time units. The length of the time domain response is approximately 12 time units. This impulse output response would appear on output terminal 85. However, as will be discussed hereinbelow, the actual waveform which will appear on output terminal 85 will be the algebraic sum of this waveform plus the waveforms produced in response to the outputs from the other networks.

Network 86 is designed to produce an output response which differs from that of network 84 in two respects. First, the peak amplitude is delayed only two time units; secondly, the length of the time domain waveform is approximately four time units. Thus, the time delay of network 86 is one-third the time delay of network 84. This impulse output response will appear on output terminal 87.

Network 88 is designed to produce impulse output response which differs from that of network 84 in two aspects. First, the peak amplitude is delayed one time unit; secondly, the length of the time domain response is approximately two time units. Thus, the time delay of network 88 is one-sixth the time delay of network 84. This impulse output response will appear on output terminal 89. The superposition of the responses of network 84 due to the impulse output responses of networks 86 and 88 and the impulse on line 90, appears on output line 85 and subsequently at terminal 72. The matched filter waveform is illustrated in FIG. 7 as output terminal 72. The frequency bandwidth limitation is the bandwidth of the impulse output response network having the longest time domain response and the narrowest frequency bandwidth, which in this example is network 84. Summarizing, the matched filter receives the input of digital data and encodes the input signal into a waveform having a plurality of sample points representative of the digital data.

Conversely, a matched filter could be designed to receive the waveform having a plurality of sample points. The received waveform would then be decoded into a plurality of separate pulses corresponding to the sample points. Thereafter, the pulses would be correlated, producing a decision as to the digital data represented by the waveform. Then the output from the matched filter would be used to establish the digital data conforming to the digital data which was encoded into the waveform. The matched filter of FIg. 6 could easily accomplish this by making line 85 the input to network 84. Thereafter, lines 87 and 89 would be the inputs of impulse response networks 86 and 88 respectively. Similarily, lines 90, 92 and 94 would be output lines from networks 84, 86 and 88. The weighting impedance section would be the same as that shown in FIG. 6 and, when combined with the impulse response networks, would be a matched filter. The matched filter is the basic component to this transmission system.

Figure 8:
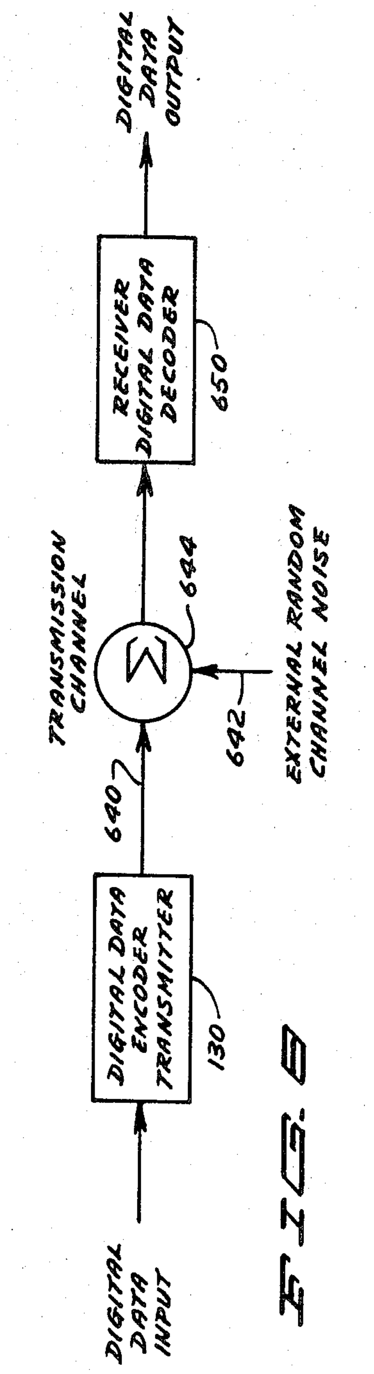
FIG. 8 illustrates in block diagram form the typical arrangement of the encoder and decoder within the transmission system.

Referring now to the block diagram of FIg. 8. This block diagram illustrates, in a very broad sense, the transmission system. The digital data to be transmitted is applied as an input signal to the digital data encoder-transmitter 130. The digital data encoder-transmitter 130 receives the input signal of digital data. The input signal is then encoded into a waveform having a plurality of sample points representative of the digital data. Thereafter, the waveform is transmitted. It becomes necessary in some applications to utilize a communication system transmitting the waveform. This communication system may be any system which is capable of transmitting and receiving an electrical pulse. In this inventive system, it is necessary to utilize communication system having amplitude modulation; for example, a balanced modulator. The reason is that the precise frequency limits of the encoded signal will be retained and thus provide for efficient utilization of the transmission channel. However, it is possible to utilize any communication system, such as frequency modulation or phase modulation, if a frequency-limited bandwidth channel is not considered necessary. Therefore, this system is more advantageously used with, but not limited to, an amplitude modulation system. Generally, if an external communication system is necessary, it will be integrated within the digital data encoder-transmitter 130. Further, it is anticipated that there exists instances where the waveform can be transmitted directly by the encoder-transmitter thus making the use of an integrated communication system unnecessary.

A transmission channel 640 is electrically connected to the digital data encoder-transmitter 130 and propagate it over the channel. The transmission channel 640 will normally have external channel noise, shown as input 642 being added into the channel by adder 644. The external noise 642 tends to attenuate and otherwise affect the signal being propagated.

The transmission channel 640 is electrically coupled to a receiver-digital data encoder 650. The receiver-digital data decoder 650 receives the propagated waveform from the transmission channel, decodes the waveform from the transmission channel into a plurality of sample pulses corresponding to the sample points. The waveform sample pulses are correlated, which includes a decision as to the digital data represented by the waveform. After the correlation, an output of digital data from the digital data system corresponds to the digital data applied as an input to the system. If an external communication system is necessary, the receiver for that system will be integrated into the receiver-digital encoder 650.

Figure 10:
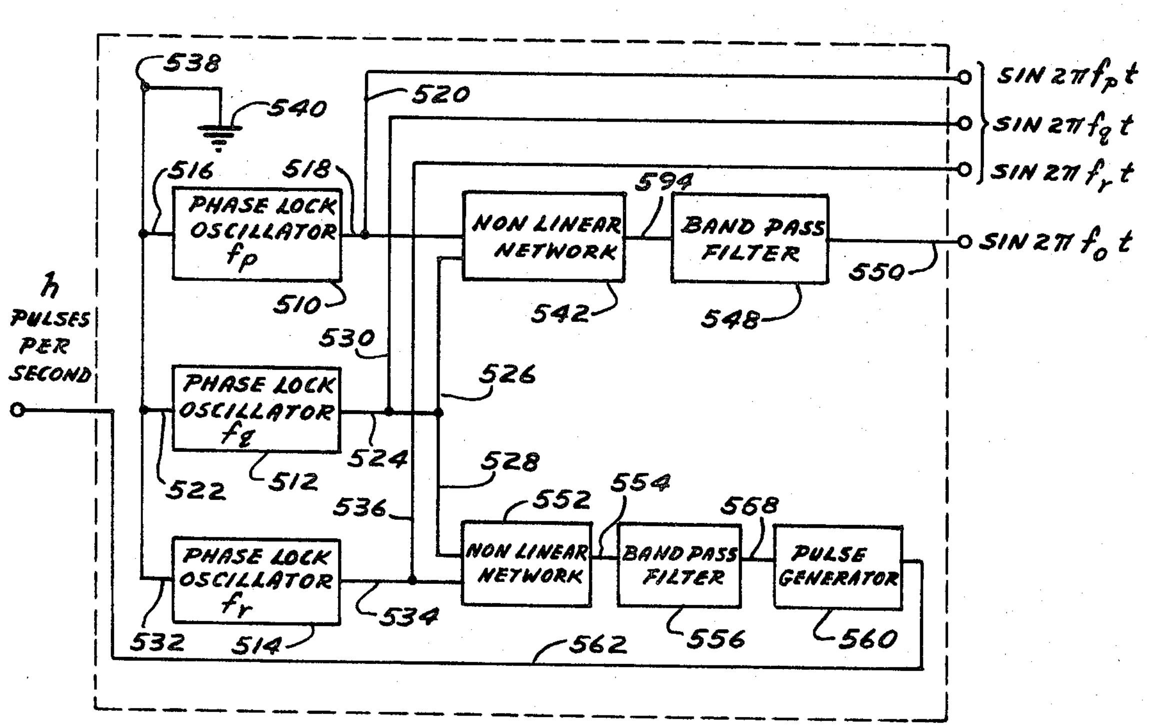
FIG. 10 is a block diagram illustrating a possible construction of Block G as shown in FIGS. 9A and 9B.
Figure 9A:
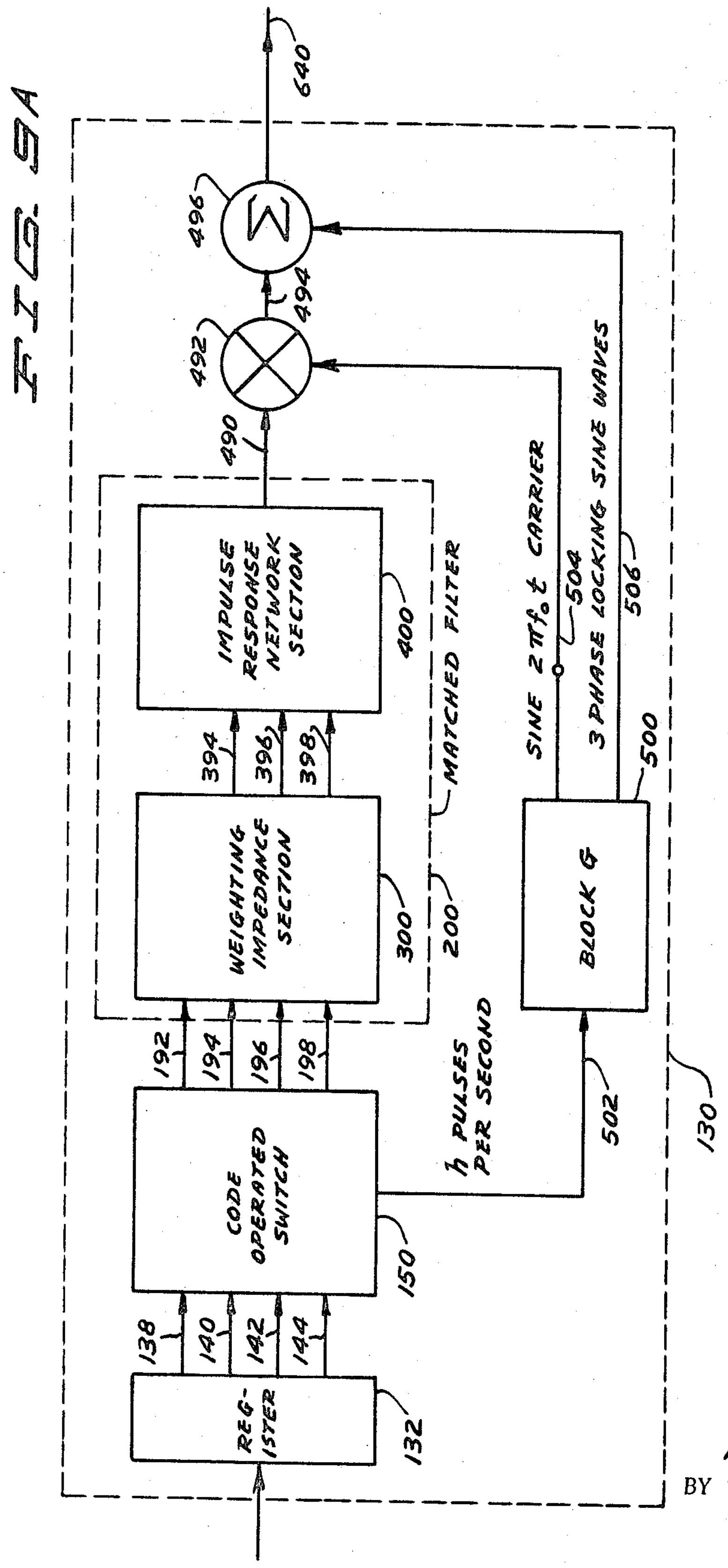
FIGS. 9A and 9B illustrate in block diagrams the essential components which comprise the transmission system, including a matched filter.

FIG. 9 is a block diagram illustrating the essential components which comprise the transmission system. Specifically, the digital data encoder-transmitter 130 and the receiver digital data decoder 650 are illustrated in a preferred embodiment which utilizes an integrated balanced modulator communication system. Referring specifically to the encoder-transmitter 130 in FIG. 9A. The digital data is applied to register 132 which is a temporary storage device. The digital data stored in the register 132 is applied to a code operated switch 150 via lines 138, 140, 142 and 144. The code operated switch 150 will be conditioned by the digital data from lines 138, 140, 142, and 144 and a pulse from line 502. When switch 150 is conditioned, an impulse function will appear on output line 192, 194, 196 or 198. The selected output passes the impulse function to a matched filter 200, specifically to the weighting impedance section 300. The weighting impedance section 300 passes the weighted impulse functions over its plurality of output lines 394, 396, and 398 to the impulse response network section 400. Thereafter, the encoded digital data appears as a waveform on output 490 from the matched filter impulsive response network 400. Output 490 passes the waveform to a multiplier 492 which essentially multiplies the waveform by a carrier frequency. This multiplying technique is called modulation and is essentially amplitude modulation. Thus, the balanced modulation waveform has a frequency spectrum centered about $f_o$ cycles per second. The waveform is carried by line 494 to an adder 496 which integrates three low level phase locking sine waves into the frequency spectrum. Thereafter, the waveform is transmitted over a frequency bandwidth-limited channel. Block G, denoted as 500, is a generator which produces a plurality of output signals. One output from Block G is an impulse function pulse. This pulse is applied on line 502 at a rate of $h$ pulses per second. A second output from Block G is the carrier appearing on line 504 denoted as sin $2\pi f_o t$. Line 504 applies the carrier to multiplier 492 which was discussed hereinbefore. A third output from Block G contains the three low level phase locking sine waves applied to the adder 496 discussed previously. FIG. 10, which is a block diagram illustrating a possible construction of Block G, will be discussed in detail hereinafter.

Figure 9B:
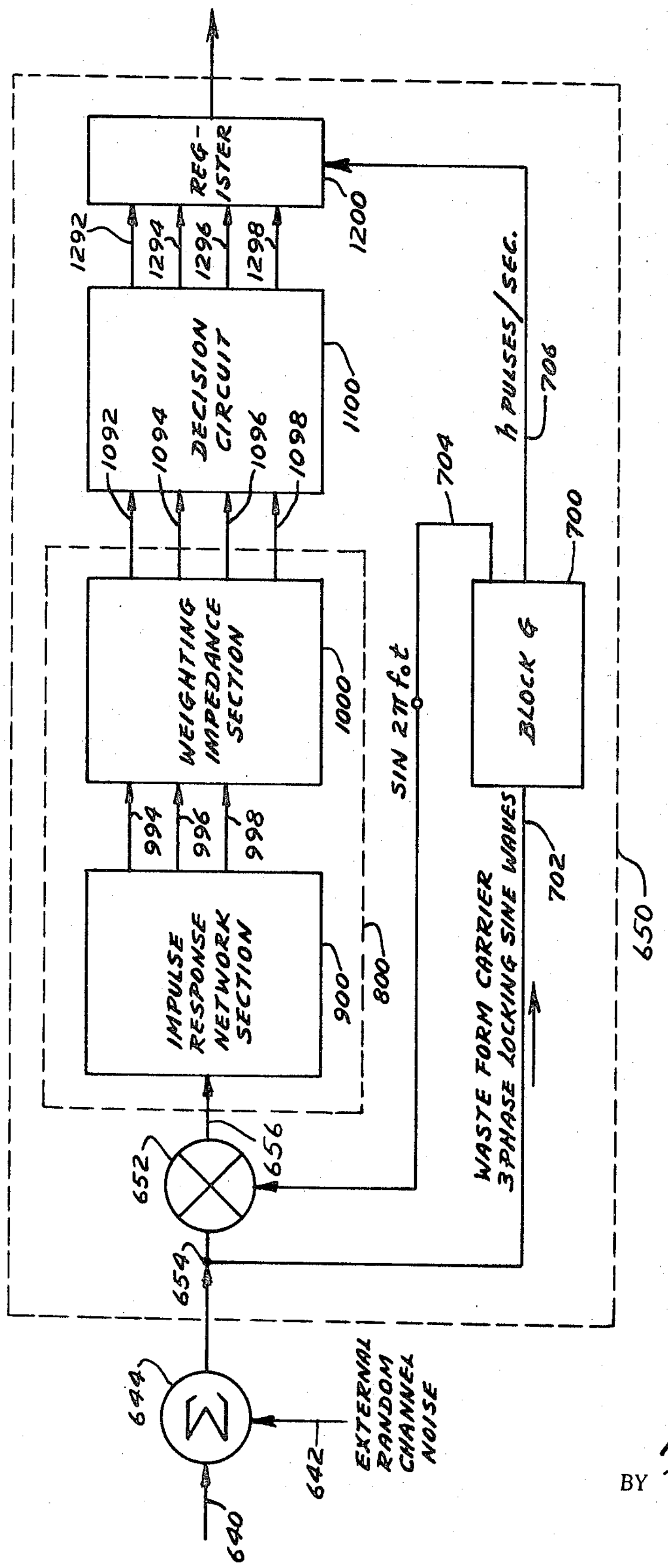

Referring now to the receiver-digital data decoder 650 in FIG. 9B. The balanced modulated waveform having the three low level phase locking sine waves integrated therein are transmitted over the frequency bandwidth limited channel 640 to the receiver-decoder 650. As the signal is propagated over the transmission channel 640, external random channel noise 642 is normally included within the channel as illustrated schematically by adder 644. The channel 640 transmits the signal to a multiplier 652. However, a tapped line 702 is electrically connected to the transmission line 640 at point 654. The tapped line 702 passes the balanced modulated waveform and the three low level phase locking sine waves into Block G, Element 700. the Block G uses the three sine waves to control generation of the carrier which appears on line 704, and an interrogation pulse of $h$ pulses per second which appears on line 706. The carrier frequency which appears on line 704 is applied to the multiplier 652 when the balanced modulated waveform which has a frequency spectrum centered about $f_o$ cycles per second is multiplied by sin $2\pi f_o$ within multiplier 652, the waveform is transferred spectrally to zero frequency. In the absence of the external random channel noise, the multiplying in the receiver-decoder has the effect of reproducing the low frequency limited bandwidth waveform which entered the multiplier 492 in the decoder-transmitter 130. When the external random channel noise is included, the effect is to distort the low frequency in a random way.

Generally, the detecting means of Block G which detects the low level phase locking sine waves, are phase locking oscillators. When the detecting means phase locking oscillators lock onto the interlaced sine waves, the oscillators generate the three sine waves. Subsequently, the sine waves are passed through the nonlinear circuits and filters to produce a carrier signal. The carrier signal is used by the multiplier for demodulating the waveform at the carrier frequency to reproduce the original waveform. However, the original waveform will be slightly distorted due to external random channel noise within the system.

Thereafter, the somewhat distorted waveform is then carried by line 656 into a matched filter 800, specifically to the impulse response network section 900. The impulse response network section 900 then decodes the waveform into a plurality of impulse output responses corresponding to the sample point. The plurality of impulse responses are passed to the weighting impedance section 1000 via lines 994, 996 and 998. The weighting impedance then weights the impulse responses in a predetermined scheme and then correlates the weighted responses to produce a plurality of correlated signals which are passed simultaneously to a decision circuit 1100 via lines 1092, 1094, 1096 and 1098. The decision circuit 1100 receives the correlated signals and then makes a decision from the correlation as to the digital data which is to be reproduced. The correlation, which includes the decision making, thus provides a method of reducing the error due to the external random channel noise. Since several sample points for the digital data are provided, the correlation of several sample points per decision provides a method of reproducing the original digital data with minimum error. The decision circuit conditions lines 1292, 1294, 1296 and 1298 to produce the digital data in the Register 1200. Register 1200 is also conditioned by line 706 from Block G, Element 700. At the rate of $h$ pulses per second, which allows the decision circuit to place digital data into the register 1200 at that rate. Thus, the transmission system receives, transmits, and delivers data at a constant rate dependent upon $h$ pulses per second.

Before discussing in detail the encoder-transmitter 130 and the receiver-decoder 650, consideration should be given to Block G which is nearly identical in both of the above units. FIG. 10 is a block diagram illustrating a possible construction of Block G which could produce the necessary outputs. Block G of the encoder-transmitter 130 may be used for purpose of explanation. Block G has three phase locked oscillators illustrated as 510, 512, and 514 respectively. The frequency of oscillator 510 shall be designated as $f_p$. The frequency of oscillator 512 shall be designated as $f_q$. The frequency of oscillator 514 shall be designated as $f_r$. The frequency of the carrier is $f_o$. The frequency $f_p$ should be higher than $f_o$, while frequencies $f_q$ and $f_r$ are lower than $f_o$. Further, the following limitations should be observed:

$$f_r - f_q = /h$$

and $$f_o = f_p = {}_p - f \text{x} 0.075h$$

Phase locked oscillators are known in the art and frequently operate using ordinary voltage-controlled crystal oscillators.

Each phase locked oscillator has in input and an output. Oscillator 510 has in input 516 which is connected to terminal 538. Terminal 538 is connected to ground terminal 540. The output 518 from oscillator 510 is connected to a nonlinear network 542. Line 520 is connected to line 518 to provide an output which is one of the three low level phase locking sine waves.

Oscillator 512 has an input 522 which is connected to terminal 538 and subsequently to ground 540. The output 524 from oscillator 512 is connected to nonlinear network 542 via line 526. Line 524 is also connected to a nonlinear network 522 via line 528. Line 530 is connected to line 524 to provide an output which is a second of the three low level phase locking sine waves.

Oscillator 514 has an input 532 which is connected to terminal 538 and subsequently to ground 540. THe output 534 from oscillator 514 is connected to nonlinear network 552. Line 536 is connected to line 534 to provide the third of the three low level phase locking sine waves.

Nonlinear network 542 has an output 594 which is connected to a band-pass filter 548. The output 550 from the filter 548 contains the carrier wave which is sin $2\pi f_o t$. Nonlinear network 552 has an output 554 which is connected to a band-pass filter 556. The output 558 from the filter 556 is connected to a pulse generator 560. The output 562 from the pulse generator carries the $h$ pulses per second.

The operation of Block G is based upon the three phase locked oscillators. Nonlinear network 542 receives the frequency $f_q$ from 512 and the frequency $f_p$ from 510. Nonlinear network 542 produces at its output 594 carries mixing products of frequencies $f_p$ and $f_q$. The output 594 carries the mixed frequencies to band-pass filter 548. The band-pass filter 548 selects the $(2f_p - f_q)$ component and rejects all other frequencies. The output of the band-pass filter 548 is therefore sin $2\pi f_o t$.

Nonlinear network 552 receives frequency $f_q$ via lines 524 and 528 and frequency $f_r$ via line 534. The network 552 generates a frequency which is:

$$(f_r - f_q = 1/5)$$

This frequency is passed via line 554 to the band-pass filter 556 which is a low pass filter. The output 558 applies the filter signal to the pulse generator 560. The pulse generator 560 simply generates a short pulse each time the sine wave passes through zero degrees. This pulse is used by the encoder-transmitter and the receiver-decoder.

The three low level phase locking waves are simultaneously generated and are carried by lines 520, 530 and 536 to an adder 496 as illustrated in FIG. 9A when the Block G is used in the encoder-transmitter. Simultaneously, the carrier signal sin $2\pi f_o t$ is carried via line 550 of FIg. 10 to a multiplier 492 as illustrated in FIG. 9A.

When Block G is used in a receiver-decoder, as in FIg. 9B, a few wiring changes are necessary. Terminal 538 is ungrounded and is electrically connected to receive the balanced modulated wave containing the three low level phase locking waves buried in its spectrum. The three phase locked oscillators produce sinusoidual output signals of approximately the same phases as the buried three level sine waves. THe lines 520, 530 and 536 which carry the low level sine waves to the adder are not utilized. However, the output 550 having the sin $2\pi f_o$and the output 562 having $h$ pulses per second is utilized. The output of Block G may be as described as producing a carrier signal and a pulse signal. Thus, Block G is a versatile building block comprising components which are known in the art.

Reference will now be made to FIGS. 11, 12, 13 and 14 which will illustrate a preferred embodiment using an example of operation. The example used to illustrate the principle of operation will include a digital word two bits in length. Bits one and two shall be designated as $j_1$ and $j_2$ respectively.

Figure 11:
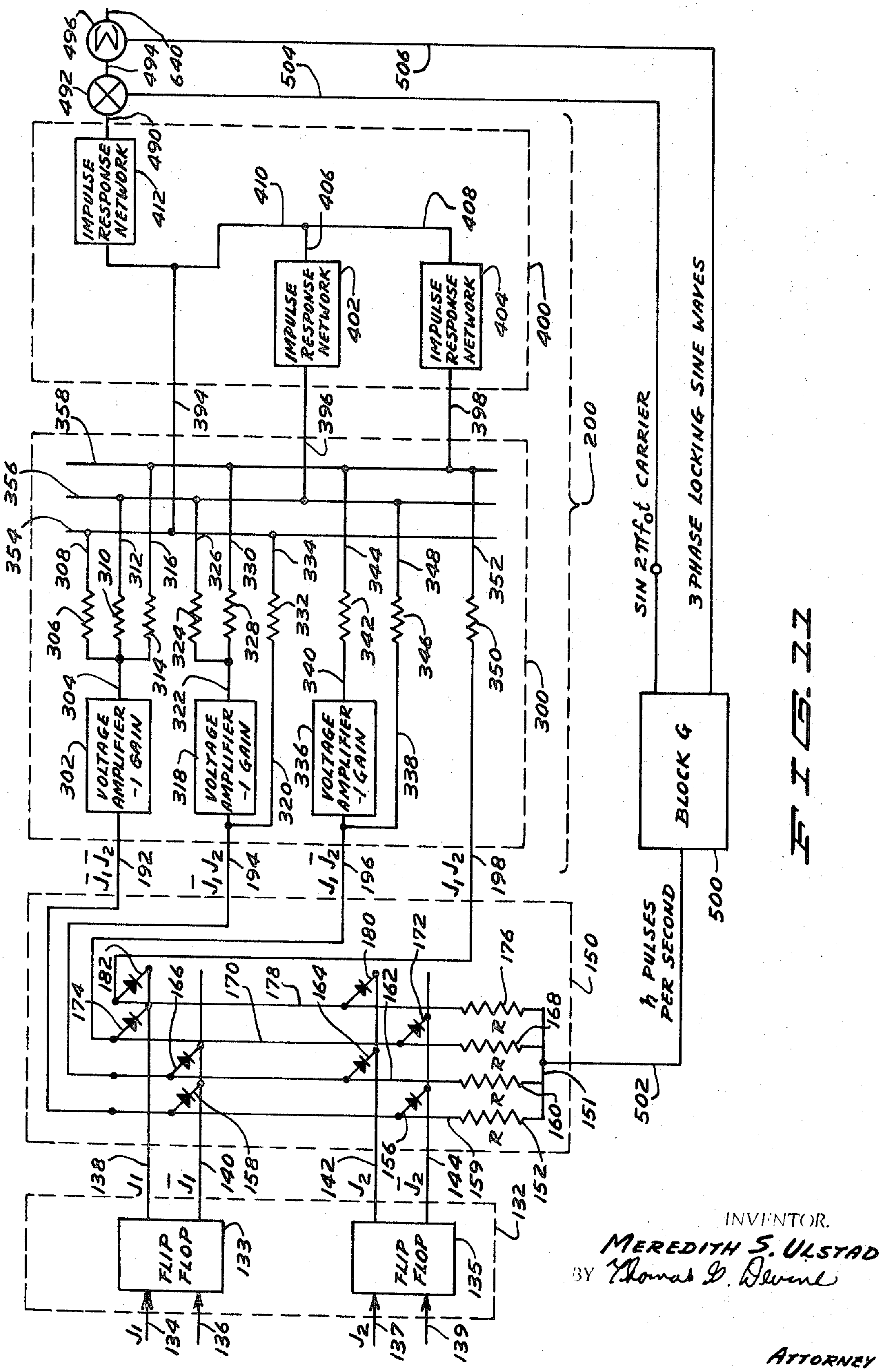
FIG. 11 is a schematic diagram of the encoder-transmitter portion of a digital data transmission system.

Referring now to FIG. 11, which is a detailed schematic of the components of the elements illustrated in the encoder-transmitter of FIG. 9A. The register 132 includes a plurality of flip-flops. These flip-flops may be of a type of bistable devices disclosed in U.S. Pat. No. 3,165,584 entitled Digital Communication System, filed on Oct. 29, 1962 by James E. Thornton and Ernest J. Hood. The flip-flops have a set input and set output line and a clear input and clear output line. When data is applied to the set input line, the flip-flop will either set or remain clear, depending upon whether the data is a 1 or a 0. The set output will indicate if the flip-flop is set or cleared. The flip-flop is cleared by applying a signal to the clear input.

Since the example of operation comprises a word two bits in length, two flip-flops 133 and 135 are necessary to temporarily store the digital information. Flip-flop 133, which holds bit $j_1$, has a set input line 134, a set output line 138, a clear input line 136, and a clear output line 140. Flip-flop 135, which holds bit $j_2$ has a set input line 137, a set output line 142, a clear input line 139 and clear output line 144. The register can be electrically connected via its set input and clear output to a high speed digital computer or other data source. Digital information can be transferred from a source directly to the flip-flops. Lines 138, 140, and 144 electrically connect the flip-flops of register 132 to the code operated switch 150. Line 502 from Block G. Element 500, applies $h$ pulses per second to 150. The code operated switch 150 is essentially a resistance-diode matrix. Line 501 resistances 152, 160, 168 and 176 are connected by a common line 151. Resistance 152 is connected via line 159 to clear output line 144 through diode 156. Also, line 159 connects resistance 152 to clear output line 140 through diode 158. Resistance 160 is connected via line 162 to set output 142 through diode 164 and to clear output line 140 through diode 166. Resistance 168 is connected via line 170 to clear output line 144 through diode 172 and to set output line 138 through diode 182. Each resistance-diode combination is subsequently connected to an output line emanating from the code operated switch 150, which are output lines 192, 194, 196 and 198. Line 192 is connected to line 159 which includes resistance 152 and diodes 156 and 158. Line 194 is connected to line 162 which includes resistance 160 and diodes 164 and 166. Line 196 is connected to line 170 which includes resistance 168 and diodes 172 and 174. Line 198 is connected to line 178 which includes resistance 176 and diodes 180 and 182.

Each of the output lines from the code operated switch 150 is an input to the weighting impedance section 300 of matched filter 200. Line 192 is an input to a voltage amplifier 302 having a −1 gain This voltage amplifier may be comprised of a transistor or may be any other amplifier known in the art. The amplifier output 304 is subsequently connected to three weighting resistances 306, 310 and 314. Weighting resistance 306 is connected to common connecting line 354 via line 308. Weighting resistance 310 is connected to a common connecting line 356 via line 312. Weighting resistance 314 is connected to a common connecting point 358 via line 316.

Line 194 is an input to a voltage amplifier 318 having a −1 gain. A tapped line 320 is connected to line 194 before the amplifier 318. The amplifier output 322 is connected to two weighting resistances 324 and 328. Weighting resistance 324 is connected to common connecting line 356 via line 326. Weighting resistance 328 is connected to common connecting line 358 via line 330. Tapped line 320 is connected to weighting resistance 332. Weighting resistance 332 is connected to common connecting line 354 via line 334.

Line 196 is an input to a voltage amplifier 336 having a −1 gain. A tapped line 338 is connected to line 196 before the amplifier 336. The amplifier output 340 is connected to a weighting resistance 342. Weighting resistance 342 is connected to common connecting line 358 via line 344. The tapped line 388 is connected to weighting resistance 346. Weighting resistance 346 is connected to common connecting line 356 via line 348.

Line 198 is connected directly to a weighting resistance 350. Weighting resistance 350 is connected to common connecting line 358 via line 352.

Lines 394, 396 and 398 couple the weighting impedance section 300 to the impulse response network section 400. Line 394 is connected to common connecting line 354 in section 300 and is directly connected to output connecting line 410 in section 400. Line 396 is connected to common connecting line 356 and is an input into an impulse response network 402. The output 406 from network 402 is connected to output connecting line 410. Line 398 is connected to common connecting line 358 and is connected as an input to impulse response network 404. The output 408 from network 404 is connected to output connecting line 410. Output connecting line 410 is an input into impulse response network 412. Network 412 has an output 490 which is connected to the multiplier 492. Line 504 connects the Block G, Element 500, to the multiplier. Line 494 connects the multiplier 492 to the adder 496. Line 506 connects Block G, Element 500 to the adder 496. The transmission channel 640 is connected to the adder 496.

The operation of the encoder-transmitter may be best understood by considering an example of operation. Assume that the flip-flops of Register 132 receive a digital data word of two bits in length. For purposes of description, when a flip-flop is set, the bit of digital data received by that flip-flop shall be designated as a 1. Conversely, when the flip-flop is cleared, the bit of digital data received by that flip-flop is 0. Further, assume that when a flip-flop is set, that the set output line is a 1, and that the potential of the set output line is more positive than the potential of the $h$ pulses per second from Block G, Element 500. Conversely, if the clear output line is a 0, that line is less positive than the potential of the $h$ pulses per second from Block G. Element 500. It is apparent that if the flip-flop is cleared, the set output line would be a 0 and the clear output line would be a 1. The potential of the set output line would be less than that of the $h$ pulses per second.

Considering now the two flip-flops 133 and 135. The digital data word can be one of four bit combinations which are 00, 01, 10 or 11. For purposes of an example, assume that the digital data word 01 is supplied to the flip-flops 133 and 135 of Register 132. Flip-flop 133 would remain clear and flip-flop 135 would set. The set output line 138 of flip-flop 133 would be a 0 and the clear output line 140 would be a 1. Thus, line 140 would be at a higher potential. Also, the set output line 142 of flip-flop 135 would be a 1, while the clear output line 144 would be a 0. Thus, line 142 would be at a higher potential.

Figure 13A:
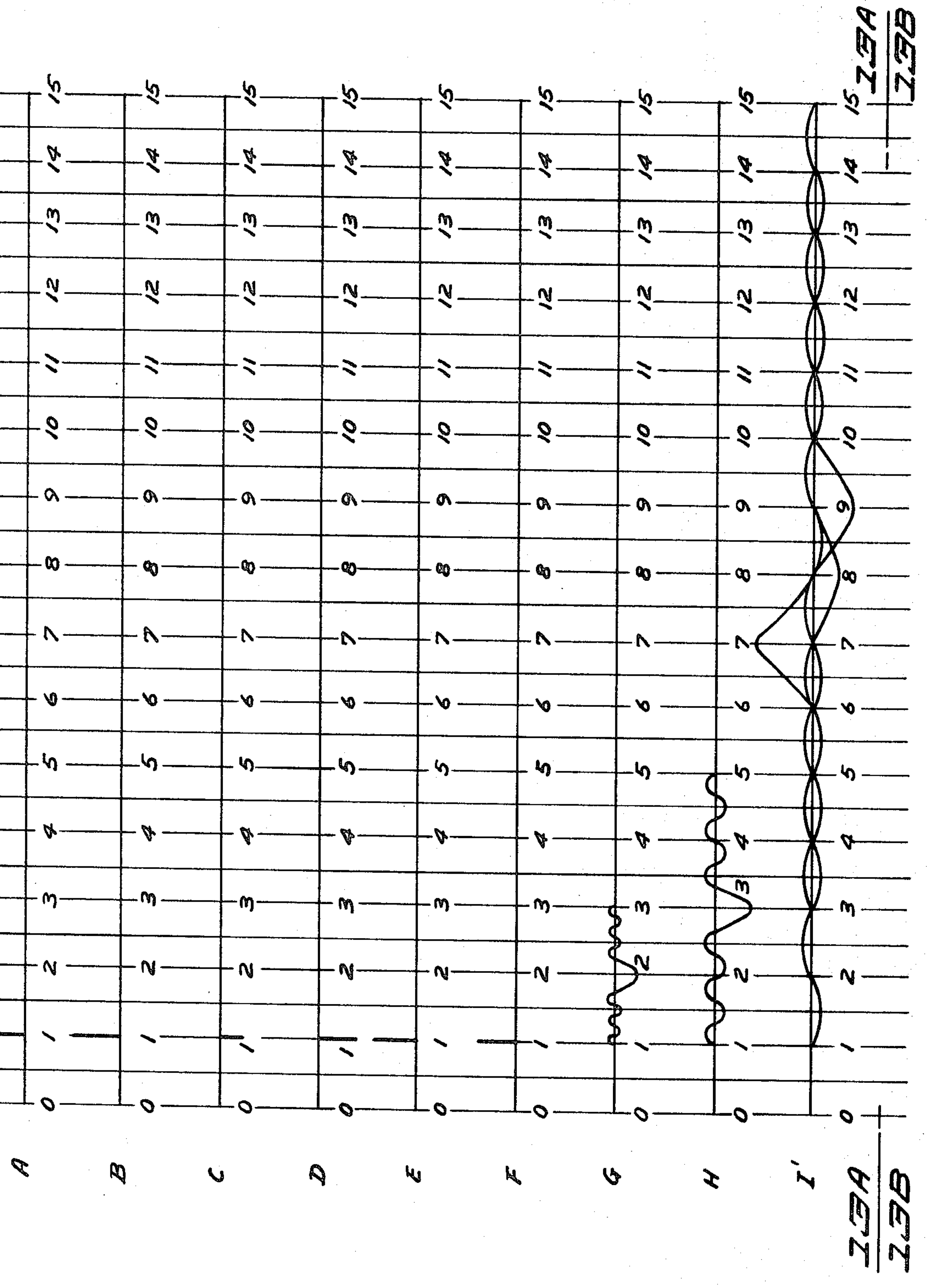
FIG. 13A is a chart illustrating waveforms associated with the encoder-transmitter of FIG. 11.

Referring to the waveforms of FIg. 13A, assume that at time 1, a pulse appearing on line 502, is applied to resistances 152, 160, 168 and 176 via line 151. The impulse function applied to line 502 is shown as waveform A on FIG. 13A.

Considering line 159 connected to resistance 152, the potential on line 159 will be raised due to the pulse applied thereon. The anode of diodes 156 and 158 will be raised in potential by line 154. Since the clear output line 144 is 0, the cathode of diode 156 is at a lower potential than the anode of 156, forwardly biasing diode 156, causing it to conduct. Considering diode 158, the clear output 140 is a 1. The cathode of diode 158, which is connected to line 140 is subsequently at a higher potential than its anode which is connected to line 159. Since the cathode of diode 158 is at a higher potential than its anode, the diode is backed biased and will not conduct. Since diode 156 conducts and diode 158 does not conduct, a signal will not appear on line 192 because it is shunted by the conducting diode 156.

Similarily, line 162 connected to resistance 160 will be raised in potential due to the pulse. Using similar reasoning as above, it will become apparent that neither diode 164 or 166 will conduct since their respective set output and clear output lines are 1 and thus at a lower potential. Since neither diode conducts an impulse will appear on line 194.

The other lines 170 and 178 connected to resistances 168 and 176 respectively will not pass a signal. Diode 174 connected to line 170 will conduct thus by passing the impulse from line 196. Also, diode 182 connected to line 178 will conduct and bypass the impulse from line 198.

The impulse appearing on line 194 is shown on Curve B in FIG. 13. The amplitude is slightly decreased due to resistance 160. Thus, a signal on line 194 represents a digital data word of 01.

Line 194 carries the impulse to the voltage amplifier 318. Conversely, lines 192, 196 and 198 do not conduct any signal to their respective voltage amplifiers or weighting resistances. The voltage amplifier 318 having a −1 gain, will invert the impulse signal, thus the amplifier output 322 will have a negative impulse. Conversely, tapped line 320 will have a positive impulse appearing thereon.

At this point, reference should be made to Table I which shows typical conductances for the weighting resistances. The magnitudes of conductances for each sampling point are such that the sum of their squares are equal to a predetermined impedance constant. This constant is depended upon the system design and is a function of impedance level, power level, etc. In the instant case, resistances 324, 238 and 332 are such that the sum of the magnitudes of their conductance squared will be equal to a constant of 1. The conductances can, of course, be scaled as necessary.

TABLE I

| Element: | Conductance |
|---|---|
| 306 | .8165 |
| 310 | .4712 |
| 314 | .3333 |
| 324 | .3333 |
| 328 | .4712 |
| 332 | .8165 |
| 342 | .3333 |
| 346 | .9424 |
| 350 | 1.0000 |

From Table 1, the values for weighting resistances 324, 328 and 332 are 0.3333, 0.4712, and 0.8165. Weighting resistance 324 will weight the negative impulse by 0.3333 and weighting resistance 328 will weight the negative impulse by a 0.4712. Conversely, weighting resistance 332 will weight the positive impulse by a 0.8165. The weighted impulse function appearing on lines 326, 330, and 334 are shown as waves C,D and E in FIG. 13A. The relative magnitudes and amplitudes of the impulse functions are directly proportional to the weighting impedance sections.

Figure 13B:
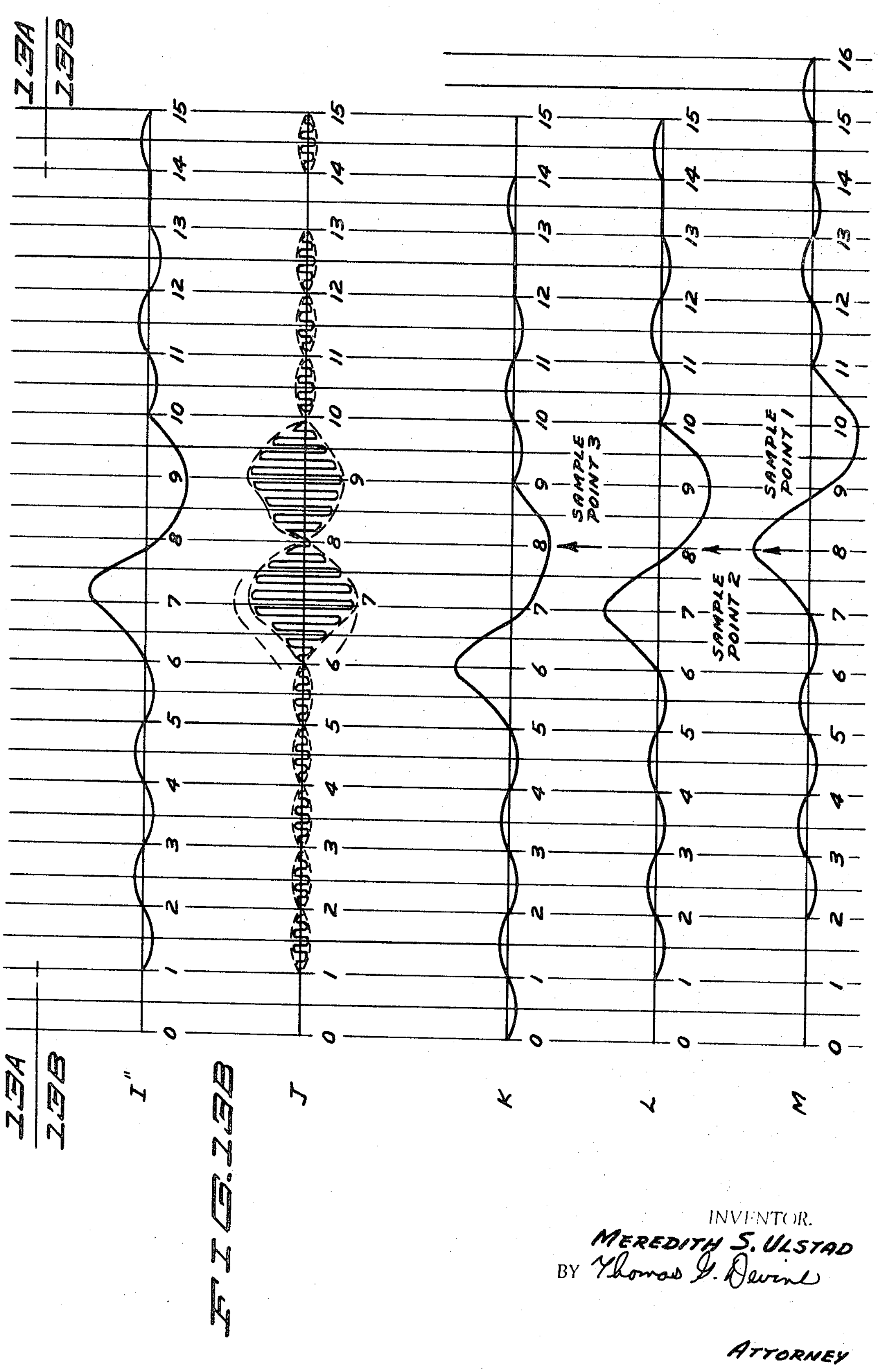
FIG. 13B is a chart illustrating waveforms associated with the receiver-decoder of FIG. 12.

Lines 326, 330 and 334 are connected to common terminating lines 356, 358, and 354 respectively. Further, the weighting impedance outputs 394, 396 and 398 are connected to common terminating lines 354, 356 and 358 respectively. Therefore, it follows that the positive impulse on line 334 is passed to line 394 via common terminating line 354. Line 394 applies this pulse directly to output connecting line 410. Simultaneously, the negative impulses on lines 326 and 330 are passed to lines 396 and 398 respectively via line 356 and 358. The negative impulse on line 396 is applied as an input to impulse response network 402. The output 406 will have the impulse response of network 402 appearing thereon. Output line 406 subsequently applies the impulsive response from network 402 to common output connecting line 410. Output line 398 applies its negative impulse to the impulse response network 404. The impulse response from network 404 appears on line 408. Line 408 applies this impulse response to the output connecting line 410. The waveforms appearing on lines 394, 406 and 408 are illustrated as waveforms F,G and H in FIG. 13A. Note that by design choice, the impulse response of network 402, Waveform G on line 406 is one-half the delay of the impulsive response from network 404, Waveform H on line 408. The amplitudes of each response might be slightly modified in a physical circuit. However, the waveforms are closely approximated to the ideal waveforms as illustrated. In comparing the time units of each peak amplitude, note that the impulse on line 394 is at time 1. (The time delays associated with the various components are negligible and thus excluded for purposes of comparing waveforms.) Impulse response network 402 delays its peak amplitude one time unit until time $t$=2. Impulsed response network 404 delays its peak amplitude two time units until time $t$=3. Subsequently, each waveform is applied concurrently to impulse response network 412 via connecting line 410. The impulse shown in Waveform F is the first to be applied to network 412 occurring at $t$=1. Impulse response network 412 produces an impulsive response having its peak amplitude delayed six time units until $t$=7, which impulse response appears on line 490. Subsequently, the negative impulse response from network 402, Waveform G is applied as an input to network 412. The effective time of input will be at time $t$=2, the time of peak amplitude. The network 412 will receive and respond to the negative impulse response from network 402 and will produce a second impulse response having a negative magnitude and amplitude with a peak occurring at $t$=8. This is a one time unit delay when compared to the first impulse response having a peak at $t$=7. Similarily, the impulse response from network 404, waveform H will be applied to network 412 at $t$=3. This is the time of the peak negative amplitude of the impulse response from network 404. Network 412 will produce an impulse response with maximum negative amplitude at $t$=9. In FIG. 13A, curve $I^1$ displays the three waveforms superimposed to illustrate their timed relationship. However, the output 490 from impulsive response network 412 will algebraically sum the individual sample point impulse output responses to produce a waveform having a plurality of sample points representative of the digital data. Waveform $I^{11}$ of FIG. 13B illustrates the final waveform which is representative of the digital data 01 as it appears on line 490.

Line 490 carries the waveform to the multiplier 492 which provides balanced modulation of the waveform by the modulating carrier frequency sin $2\pi f_0 t$. The carrier frequency is applied as an input to multiplier 492 via line 504. As discussed hereinbefore, the carrier frequency is generated within Block G, Element 500. The output 494 from multiplier 492 applies the balanced modulated waveform to an adder 496. A second input to adder 496 is line 506 which adds three low level phase locking sine waves within the balanced modulated waveform to an adder 496. A second input to adder 496 is line 506 which buries three low level phase locking sine waves within the balanced modulated waveform spectrum. The output of the adder 496 is connected to a frequency limited bandwidth channel 640. Waveform J of FIg. 13 illustrates the waveform as it is propagated via the transmission channel 640. The three phase locking sine waves cause the envelope of the modulated waveform to appear rippled.

From the above discussion, it is apparent that the number of digital data bits to be transmitted can be increased by the addition of more electrical components. The illustrative example of two bits was chosen to show typical operation and it is anticipated that one skilled in the art could expand or modify the above scheme to incorporate a larger digital data word or more sampling points for each digital data word.

Figure 12:
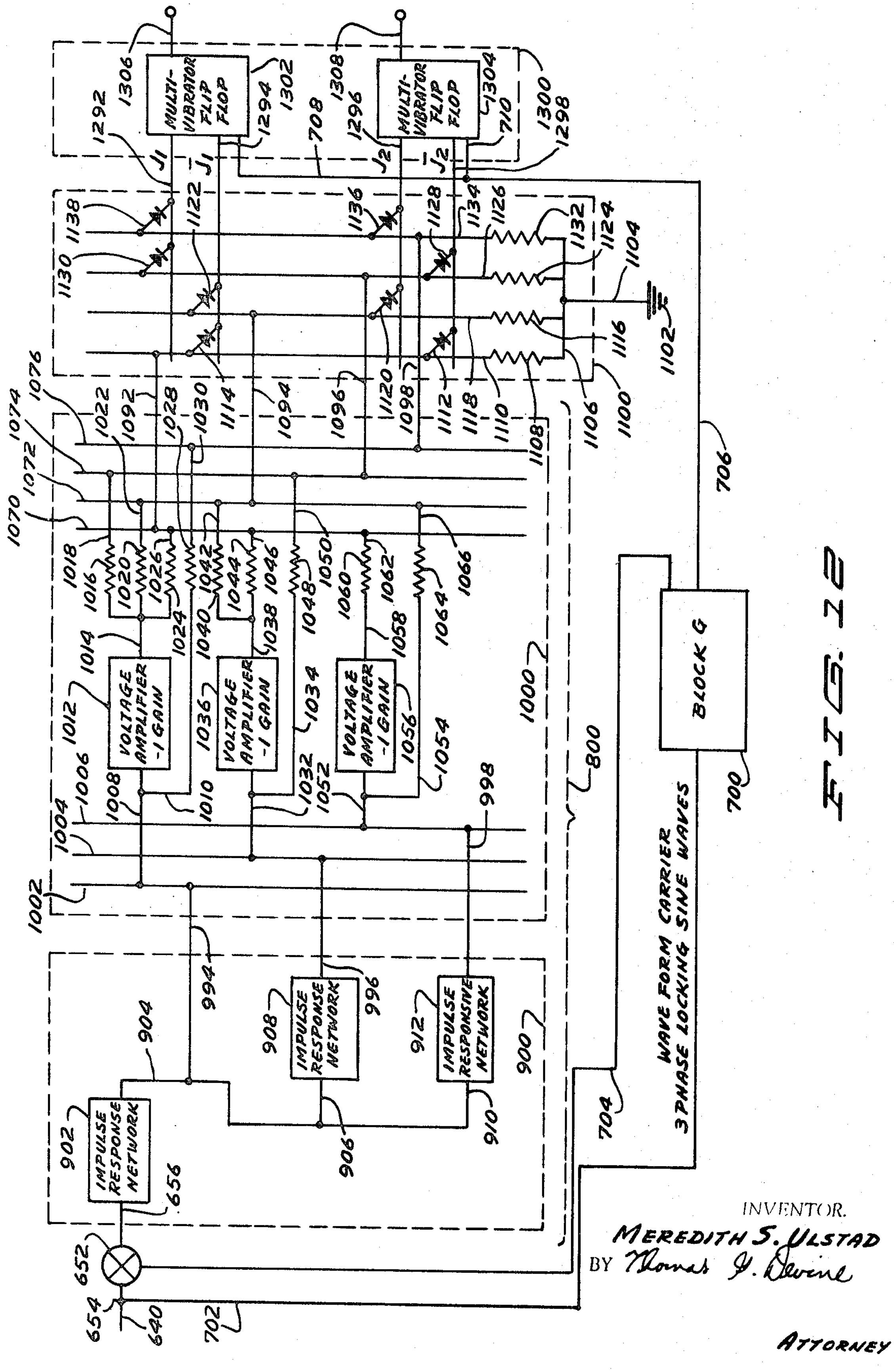
FIG. 12 is a schematic diagram of the receiver digital data decoder portion of a transmission system.

Referring now to FIG. 12 which is the receiver-decoder 650 of FIg. 9B. the transmission channel 640 is applied to the multiplier 652. A tapped circuit line 702 is connected to the transmission channel 640 at point 654. Line 702 is an input into Block G, Element 700. Line 656 applies the output of the multiplier 652 to the input of impulse response network 902. Network 902 is located within an impulse response network section 900 of a matched filter 800. The multiplier 652 has a second input line 704 from Block G, Element 700 which applies the carrier wave frequency thereto. An output 904 from network 902 is connected to three input lines 994, 906, and 910. Line 994 is input directly connected into a weighting impedance section 1000 of matched filter 800. Line 906 is an input to impulse response network 908. An output 996 from network 908 is an input into the weighting impedance section 1000. Line 910 is an input into impulse response network 912. An output 998 from network 912 is an additional input into weighting impedance section 1000.

Weighting impedance section 1000 has three common connecting lines 1002, 1004, and 1006. Lines 994, 996 and 998 from the response network section 900 are connected to common connecting lines 1002, 1004 and 1006 respectively. Line 1002 is connected to line 1008 which is an input to a voltage amplifier 1012 having *a* −1 gain. A tapped line 1010 is connected to line 1008 before the amplifier 1012 input. Line 1004 is connected to line 1032 which is an input into voltage amplifier 1036 having *a* −1 gain. A tapped line 1034 is connected to line 1032 before the amplifier 1036 input.

Line 1006 is connected to line 1052 which is an input into a voltage amplifier 1056 having *a* −1 gain. A tapped line 1054 is connected to line 1052 before the input of amplifier 1056. The weighting impedance section 1000 has four output terminating lines 1070, 1072, 1074, and 1076. The output terminating lines are used to receive outputs from weighting resistances as follows: amplifier 1012 has an output 1014 which is connected to resistances 1016, 1020, and 1024. Resistance 1016 is connected to output terminating line 1074 via line 1018. Resistance 1020 is connected to output terminating line 1072 via line 1022. Resistance 1024 is connected to output terminating line 1070 via line 1026. The tapped line 1010 is connected to resistance 1028 which is subsequently connected to the output terminating line 1076 via line 1030.

Amplifier 1036 has an output 1038 which is connected to resistance 1040 and 1044. Resistance 1040 and resistance 1044 are connected to output terminating lines 1072 and 1070 via lines 1042 and 1046 respectively. Tapped line 1034 is directly connected to resistance 1048, which resistance is connected to output terminating line 1074 via line 1050.

Voltage amplifier 1056 has an output 1058 which is connected to resistance 2060. Resistance 1060 is connected to output terminating line 1070 via line 1062. Tapped line 1054 is connected to resistance 1064. Resistance 1064 is connected to output terminating line 1072 via line 1066.

The output terminating lines of he weighting impedance section 1000 are connected to the decision circuit 1100 via connecting lines 1092, 1094, 1096 and 1098. Connecting lines 1092, 1094, 1096 and 1098 emanate from output terminating lines 1070, 1072, 1074, and 2076 respectively.

The decision circuit 1100 is basically a resistance-diode matrix. The diodes used are merely peak riding electrical devices. The decision circuit 1100 has resistances 1108, 1116, 1124, and 1132 which are connected to a common line 1106. Common line 1106 is connected to a ground terminal 1102 via line 1104. Resistance 1108 is connected to a line 1110. Line 1110 is subsequently connected to the anodes of diodes 1112 and 1114. Resistance 1116 is connected to line 1118. Line 1118 is connected to the anodes of diodes 1120 and 1122. Resistance 1124 is connected to line 1126. Line 1126 is connected to the anodes of diodes 1128 and 1130. Resistance 1132 is connected to line 1134. Line 1134 is connected to the anodes of diodes 1136 and 1138. Referring again to connecting lines 1092, 1094, 1096 and 1098 from the impedance weighting section 1000 into the decision circuit 1100. Connecting line 1092 is connected to line 1110. Connecting line 1094 is connected to line 1118. Connecting line 1096 is connected to line 1126. Line 1098 is connected to line 1134. The decision circuit 1100 has correlation output lines 1292, 1294, 1296 and 1298. Correlation output line 1292 is connected to the cathodes of 1130 and 1138. The anode of diode 1130 is subsequently connected to line 1126. The anode of diode 1138 is connected to line 1134. Correlation output line 1294 is connected to the cathodes of diodes 1114 and 1122. The anode of diode 1114 is connected to line 1110. The anode of diode 1122 is connected to line 1118. Correlation output line 1296 is connected tr the cathodes of diodes 1120 and 1136. The anode of diode 1120 is connected to line 1118. The anode of diode 1136 is connected to line 1134. The correlation output line 1298 is connected to the cathodes of diodes 1112 and 1128. The anode of diode 1112 is connected to line 1110. The anode of diode 1128 is connected to line 1126. The correlation output lines are applied as inputs to register 1300. Register 1300 includes multivibrator flip-flops 1302 and 1304. The multivibrator flip-flops 1302 and 1304 are flip-flops which can be set or cleared, but the setting or clearing of the flip-flops are dependent upon whether the set input lines or the cleared input lines have the largest voltage at the instant when the multivibrator flip-flops are conditioned to set. Further, these flip-flops will be conditioned only when they are pulsed by an external control pulse. Multivibrator flip-flop 1302 has its set input line directly connected to correlation output line 1292, while the clear input line is directly connected to correlation output line 1294. Similarly, flip-flop 1304 has its set input line connected directly to correlation output line 1296 while its clear input lines is directly connected to correlation output line 1298. Flip-flop 1302 has a pulse input line 708, while flip-flop 1304 has a pulse input line 710. Pulse input lines 708 and 710 are connected to line 706 which is directly connected to Block G, Element 700. Multivibrator flip-flop 1302 has an output 1306 which is its set output line. Multivibrator flip-flop 1304 has an output 1308 which is its set output line.

Referring now to Waveform J in FIG. 13B. The balanced modulated waveform which includes the phase locking sine waves is propagated on transmission channel 640 as set forth hereinbefore. Transmission channel 640 applies the balanced modulated waveform to multiplier 652. However, tapped line 702 which is connected to the transmission channel at point 654 carries a portion of the propagated balance modulated waveform and phase locking sine waves into Block G, Element 700. Block G's three phase locking oscillators lock into their appropriate frequency based on the frequency of the three phase locking sine waves buried in the modulated waveform. When Block G, Element 700 locks in on the respective frequencies, the carrier frequency is generated and applied to line 704. Line 704 applies the carrier frequency to multiplier 652. The balanced modulated waveform is multiplied by the carrier signal sin $2\pi f_0 t$ within the multiplier 652 which transfers the waveform spectrally to zero frequency. The resulting waveform is applied by line 656 to impulse response network 902. Network 902 allows the waveform to pass while rejecting external random channel noise outside the desired frequency spectrum. Actually, there is also a waveform in the vicinity of $2 f_0$ but the impulse response network section 902 will reject it. Thus, the filtered waveform will appear on output line 904. The waveform K in FIG. 13B illustrates the waveform of the wave on output line 904 assuming the waveform to begin at a new time 0.

The Waveform K as it appears on output line 904 is the same shape and duration as waveform $I^{11}$ of FIG. 13B. Waveform $I^{11}$ is the waveform from the digital data-encoder transmitter before the waveform was modulated. These sampling points occur within this waveform as may be seen in $I^{1}$. Each sampling point peak occurs at certain time which is determined by the delay of the networks. In Waveform $I^{11}$, a first sampling point occurred at time 7, a second at time 8 and a third at time 9. Thus, it is apparent that the second sampling point occurred within the waveform at one time unit after the first sampling point and that the third sampling point occurred within the waveform one time unit after the second sampling and two time units after the first sampling point. Waveform K, which is identical to waveform $I^{11}$, contains the three sampling points. Thereafter, Waveform K on the new scale, starting at time 0 includes the three sampling points. The first sampling point occurs at time 6, the second sampling point occurs at time 7 and the third sampling point occurs at time 8. Subsequently, the Waveform K is concurrently applied to networks 908 and 912. The networks 908 and 912 will delay the waveform such that the three sampling points will occur at the same instant in time. Thus, the three sample points may then be correlated as to the data represented by this waveform.

Considering specifically now the operation of the receiver-digital data decoder in delaying the waveforms for correlation. Output line 904 will apply the waveform to lines 994, 906 and 910. The waveform appearing on line 994 would be carried directly to common connecting line 1002.

Considering now the Waveform K which appears on line 906. Line 906 receives the Waveform K and applies it to network 908. Network 908 will pass the waveform delaying it one time unit with respect to the waveform as it appeared on line 994. The one time unit delayed waveform is shown as Waveform L in FIG. 13B and will appear on output line 996. Output line 996 thereafter applies Waveform L to common connecting line 1004.

Line 910 receives the Waveform K and applies it to Network 912. Network 912 will similarily pass the waveform but will delay it two time units with respect to the waveform as it appeared on line 994. The two unit delayed waveform is shown as Waveform M in FIG. 13B and will appear on output line 998. Output line 998 thereafter applies Waveform M to common connecting line 1006.

Figure 14:
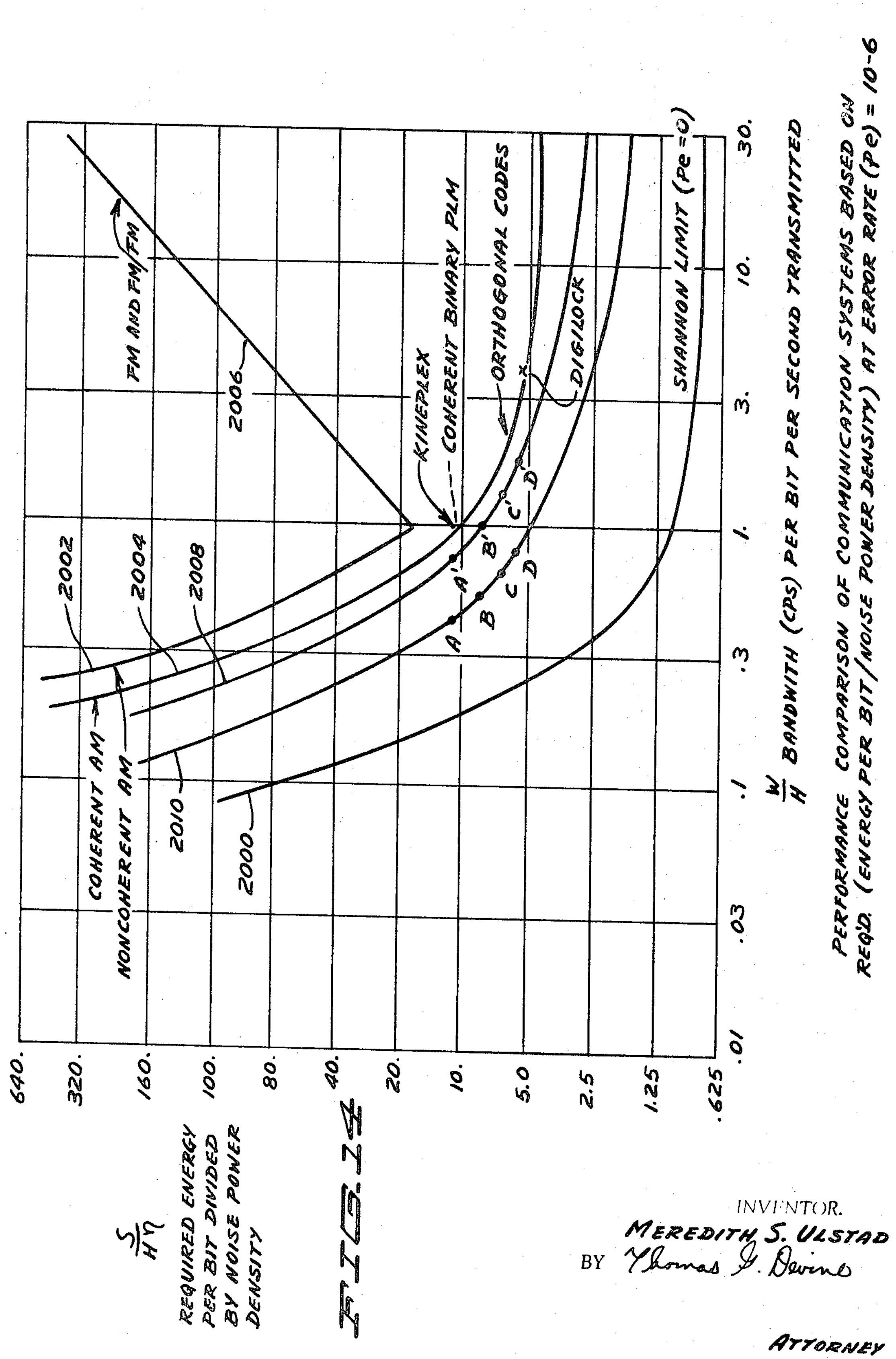
FIG. 14 is a graph which illustrates, by means of curves, comparison of performance between an ideal data transmission system, prior art transmission systems, and the inventive transmission system.

Referring to FIG. 13B, specifically curves K,L and M. A timed relationship between the three waveforms can be seen. Specifically, Waveform K is identical time wise to the output of network 902. This means that the first sampling point will occur at $t$=6, the second sampling point will occur at $t$=7, and the third sampling point will occur at $t$=8. Waveform L is identical in shape and time duration to Waveform K. However, the entire waveform has been delayed by network 908 such that the first sampling point occurs at $t$=7, the second sampling point occurs at $t$=8, and the third sampling point occurs at $t$=9. Waveform M, which is the output of network 912, is again identical in shape and time duration to Waveform K. However, Waveform M has been delayed two time units with respect to Waveform K and one time unit with respect to Waveform L. Thus, the first sampling point will occur at $t$=8, the second sampling point will occur at $t$=9, and the third sampling point will occur at $t$=10. By comparing the three curves as shown in FIg. 14, it is apparent that at $t$=8, the third sampling point is available on Waveform K, and the second sampling point is available on waveform L, and the first sampling point is available on Waveform M. Thus, it is the delayed timed relationship between these three waveforms which provides a common time when the three sample points can be correlated. THereafter, the three waveforms are passed via output lines 994, 996 and 998 to common connecting lines 1102, 1004, and 1006 respectively. THereafter, the common connecting lines will pass the waveforms into the weighting impedance section 1000 for correlation.

Thus, each of the three waveforms contains the three sampling points originally produced in the encoder-transmitter unit. However, each waveform has been delayed by the networks so that each sample point can be detected simultaneously. By correlating these three sample points, the original data can be reproduced. Thereafter, correlation is accomplished by the weighting impedance section 1000 in cooperation with the impulsive response network section 900.

At this point, it may be well to reference Table II which sets forth conductances for the resistances associated with the weighting impedance network section 1000.

TABLE II

| | Conductance | Equivalent element of encoder-transmitter |
|---|---|---|
| Resistance: | | |
| 1016 | .3333 | 342 |
| 1020 | .4712 | 328 |
| 1024 | .3333 | 314 |
| 1028 | 1.0000 | 358 |
| 1040 | .3333 | 320 |
| 1044 | .4712 | 310 |
| 1048 | .9424 | 346 |
| 1060 | .8165 | 306 |
| 1064 | .8165 | 322 |

The conductances are selected to coordinate with the values of the conductances in the encoder-transmitter weighting impedance section 300 as shown in FIg. 9 in the following manner.

The conductance values selected for use in the encoder-transmitter weighting impedance section 300 were discussed in detail hereinbefore. The values of the conductances in the weighting impedance network section 1000 are identical in value but are arranged in a scheme such that the correlated output will occur concurrently on output connecting lines 1092, 1094, 1096 and 1098. Table II compares the resistance of the impedance section 1000 with the resistances of impedance section 300. The values of the resistance section are identified by element number. Thus, the connecting pattern of the resistances in the receiver-decoder weighting impedance section 1000 are related in a predetermined scheme to the resistances of the encoder-transmitter weighting impedance section 300.

Generally, as the waveforms K,L and M are passed from the impulse response section 900 to the weighting impedance section 1000, the waveforms, or a portion thereof, will be passed through a voltage amplifier having $a$ −1 gain. However, each impulse response will have a portion of the original waveform diverted via a tapped line while the remainder of the waveform is passed through the voltage amplifier. The voltage amplifier will apply the reversed waveform to its respective weighting resistance. Each resistance will weight the waveform and pass the weighted waveform to its respective output terminating line. Simultaneously, the portion of the original waveform diverted by the tapped line will be weighted by that tapped line's weighting resistance and will thereafter be applied to its output terminating lines. Thus, at each interval of time, each waveform will be simultaneously and concurrently weighted and passed. The output terminating lines will algebraically sum the individual weighted waveforms appearing thereon. The algebraic sum of the waveforms will appear on the output lines from the weighting impedance section 1000.

Considering in detail now the correlation of the three sample points on the three waveforms. When the waveforms appear on output terminating lines 1070, 1072, 1074 and 1076, the algebraic sum of the amplitudes would be continuously varying over the entire time duration of the three waveforms. However, correlation will occur at $t$=8, because it is at this time that the three sampling points will be concurrently present on the output terminating lines. To illustrate the correlation operation, assume that the instantaneous amplitude of the first sampling point is $a$+1, and that of the second sampling point is $a$−0.5, and that of the third sampling point is −0.75. By assuming unitized values of the sampling points, a relative comparison can be made to determine which digital data is represented by this waveform. Since it is apparent that correlation occurs at $t$=8, this time will be taken as an example.

At $t$=8, Waveform K will appear on common connecting line 1002. Further at $t$=8 the third sampling point on waveform K will have an amplitude of −0.75. The waveform would be passed via line 1008 to amplifier 1012. However, a portion of this waveform would be diverted by tapped line 1010. The voltage amplifier 1012 having a gain of −1 will reverse the amplitude of the waveform and apply it to line 1014. The instantaneous value of the amplitude at this point would be a +0.75.

Referring to Table II. The conductance value of resistance 1016 is 0.3333. Resistance 1020 has a conductance of 0.4712 and resistance 1024 will have a conductance of 0.3333. Thus, as the waveform amplitude is passed simultaneously from output 1014 to each resistance, the amplitude will be weighted by each resistance in a predetermined amount. Specifically, resistance 1016 will weight the +0.75 amplitude to approximately a +0.25 amplitude and apply it to output terminating line 1074. Similarly, resistance 1020 will weight the instantaneous amplitude to approximately a +0.35 amplitude and apply it to output terminating line 1072. Simultaneously, a resistance 1024 will weight the instantaneous amplitude to approximately a +0.25 and apply it to output terminating line 1070. Tapped line 1010 will divert a portion of the original waveform having a −0.75 amplitude to maintain −0.75 and apply it to output terminating line 1076. Summarizing, output terminating line 1070 would have a waveform of instantaneous amplitude of +0.25 applied thereon, line 1072 will have a waveform of instantaneous amplitude of + 0.35 applied thereon, line 1074 will have a waveform of instantaneous amplitude of +0.25 applied thereon and line 1076 will have a waveform of instantaneous amplitude of −0.75 applied thereon.

Waveform L will appear on output line 996 and at time 8 will have an amplitude of −0.5. Line 996 will apply the waveform to common connecting line 1004. Line 1004 would apply the waveform to line 1032 which is the input into voltage amplifier 1036. However, tapped line 1034 would divert a portion of this waveform and allow the remainder to pass into voltage amplifier 1036. Waveform L, at time $t$=8, has an amplitude of −0.5. This waveform will be reversed by the amplitude 1036 and applied as +0.5 to output line 1038. Output line 1038 will apply +0.5 amplitude to resistance 1040. Resistance 1040 would weight the +0.5 to a +0.17 amplitude an apply it via line 1042 to output terminating line 1072. Output line 1038 will apply +0.5 amplitude to resistance 1044. Resistance 1044 will weight the +0.5 to approximately +0.24 and apply it via line 1046 to output terminating line 1070. Concurrently, tapped line 1034 would apply the −0.5 amplitude to resistance 1048. Resistance 1048 would weight the −0.5 amplitude to −0.47 amplitude and apply it via 1050 to output terminating line 1074. Summarizing, at time $t$=8, Waveform L would have a weighted amplitude of: +0.24 on output terminating line 1070; of +0.17 on output terminating line 1072; and would have an amplitude of −0.47 on output terminating line 1074. Output terminal line 1076 does not receive a weighted amplitude from Waveform L applied thereon.

Waveform M at time $t$=8 would appear on output line 998 having an amplitude of +1. Output line 998 would apply the waveform M to common connecting line 1006. Common connecting line 1006 would apply the waveform to input line 1052. However, tapped line 1054 would divert a portion of the waveform and allow the remainder to be applied to voltage amplifier 1056. Amplifier 1056 would invert the waveform and apply an amplitude of −0.1 on output line 1058. Output 1058 would apply the −1 amplitude to resistance 1060. Resistance 1060 would weight the −1 amplitude and apply a −0.82 amplitude via line 1062 to output terminating line 1070. Similarly, tapped line 1054 would apply the +1 amplitude to resistance 1064. Resistance 1064 would weight the amplitude to a +0.82 and apply it via line 1066 to output line 1072. Summarizing, Waveform M at $t$=8 will apply an amplitude of +0.82 on output terminating line 1072. Output terminating lines 1074 and 1076 would not receive a weighted amplitude from Waveform M.

Table III tabulates the individual amplitude on each output terminating line and each waveform at $t$=8. Further, Table III shows the sum of the individual weighted amplitude on each output terminating line for each waveform. The resulting net amplitude on output terminating line 1070 is a −0.23. The net amplitude on output terminating line 1072 is a +1.34. The net amplitude on output terminating line 1074 is a −0.22. The net amplitude on output terminating line 1076 is a −0.75.

TABLE III

| | Element | 1070 | Element | 1072 | Element | 1074 | Element | 1076 |
|---|---|---|---|---|---|---|---|---|
| Waveform: | | | | | | | | |
| K (−.75) | 1024 | +.35 | 1020 | +.35 | 1016 | +.25 | 1028 | −.75 |
| L (−.5) | 1044 | +.24 | 1040 | +.17 | 1048 | −.47 | | |
| M (+1) | 1060 | −.82 | 1064 | +.82 | | | | |
| | Sum to output connecting line | | | | | | | |
| | 1092 | −.23 | 1094 | +1.34 | 1096 | −.22 | 1098 | −.75 |

Output terminating line 1070 will apply its −0.23 amplitude to connecting line 1092. Output terminating line 1072 will apply its +1.34 amplitude on output connecting line 1094. Output connecting line 1074 would apply its −0.22 amplitude to output connecting line 1096. Output terminating line 1076 would apply its −0.75 amplitude to output connecting line 1098. Output connecting lines 1092, 1094 and 1098 would apply their respective amplitudes to the decision circuit 1100.

Output connecting line 1092 would apply the −0.23 amplitude to line 1110. Output connecting line 1094 will apply its +1.34 amplitude to line 1118. Output connecting line 1096 would apply its −0.22 amplitude to line 1126. Output connecting line 1098 will apply its −0.75 amplitude to line 1134.

Considering first line 1110. The amplitude on line 1110 is −0.23 which is applied across resistance 1108, and subsequently, to ground terminal 1102 via lines 1104 and 1106. Thus, diodes 1112 and 1114 would have their anodes biased at a −0.23, making the diodes 1112 and 1114 backed biased. Line 1118 will apply its +1.34 amplitude across resistance 1116, and subsequently, to grounded terminal 1102 via lines 1104 and 1106. Line 1118 would forwardly bias the anodes of diodes 1120 and 1122 with a +1.34 thereby making the diodes conductive. Line 1126 will apply its −0.22 amplitude across resistance 1124 and subsequently to ground terminal 1102 via lines 1104 and 1106. The anodes of diodes 1128 and 1130 would be biased at a −0.22 making diodes 1128 and 1130 backed biased. Line 1134 applies its −0.75 amplitude across resistance 1132 and subsequently to ground terminal 1102 via lines 1104 and 1106. The anodes of diodes 1136 and 1138 would be biased at −0.75 making diodes 1136 and 1138 backed biased.

Correlation output line 1292 is connected to diode 1130 and 1138. Since diode 1130 is backed biased at a −0.12 and diode 1138 is backed biased at a −0.75, line 1292 would not have an amplitude applied thereon. Correlation output line 1294 is connected to diodes 1114 and 1122. Since diode 1122 is forwardly biased at a +1.34 and diode 1114 is backed biased at a −0.23, correlation output line 1294 is biased at $a$=1.34. Correlation output lines 1292 and 1294 are the set input line and clear input line respectively to multivibrator flip-flop 1302.

Correlation output line 1296 is connected to diodes 1120 and 1136. Since diode 1120 is forwardly biased at a +1.34, and diode 1136 is backed biased at a −0.75, correlation output line 1296 will be biased at a +1.34. Correlation output line 1298 is connected to diode 1112 and diode 1128. Diode 1128 is backed biased at a −0.22 and diode 1112 and is backed biased at a −0.23. Thus, correlation output line 1298 would not have an amplitude applied thereon. Correlation output lines 1296 and 1298 are the set input line and the clear input line respectively to multivibrator flip-flop 1304.

At $t$=8, Block G, Element 700 will apply pulse H on line 706. Line 706 will apply the pulse to the pulse input lines 708 and 710 into flip-flop 1302 and flip-flop 1304 respectively. This pulse will condition the flip-flop so that they may either set or remain clear depending upon the voltage impressed upon respective set input and clear input lines. As discussed hereinbefore, clear input line 1294 to flip-flop 1302 has the largest peak applied thereon with respect to set input line 1292. Thus, flip-flop 1302 will remain clear. Concurrently, flip-flop 1304 set input line 1296 has the largest peak applied thereon with respect to clear input line 1298. Thus, flip-flop 1304 will be set.

Since flip-flop 1302 remains clear, set output line 1306 would be a 0. Conversely, since flip-flop 1304 has been set, its set output line 1308 would have a 1. Thus, the output from Register 1300 is a 01. This digital data conforms exactly to the digital data which is applied as an input to the digital data encoder-transmitter of the transmission system.

The conditioning pulse which is generated within Block G will also condition the flip-flop of Register 1300 in the point of maximum correlation. The diodes as used in decision circuit 1100 are merely peak voltage riding devices and will be conditioned during the entire time duration of the waveforms. Thus, it is important that the multivibrator flip-flops be conditioned to set at the peak voltage time at which the maximum correlation occurs.

The rate at which the digital data can be applied to Register 1300 of the receiver-digital data encoder 650 would be exactly the same as the rate at which digital data is supplied to Register 132 of the digital data encoder-transmitter 130. The constant transmission rate is maintained and controlled by the phase locked oscillators in Block G, Element 500 in the encoder-transmitter unit 130.

As an example of the efficiency and the potential of the inventive transmission system refer to FIG. 14. FIG. 14 is a graph in which the performance of several communication systems, which are presently being utilized in the transmission of digital data are compared having an error rate of $(P_e)=10^{16}$ when operated in the presence of additive gaussian noise. The graph was illustrated in an article entitled "Communication Efficiency Comparison of Several Communication Systems" by M. R. Sanders in the Proceedings of the IRE, Apr. 1960. The abscissa of the graph is $W/H$ which is the bandwidth per bit per second transmitted. The ordinate $S/H\eta$ is the energy required per bit divided by the noise power density. For purpose definition:

$H$=Maximum possible zero error rate information capacity of a channel $W$=Channel bandwidth in cycles/second $S$=Average signal power in bandwidth $W$ $N$=Average additive gaussian noise power in bandwidth $W$ $\eta$= noise power density (one sided)

Shannon's formula for the information capacity of an identical system bits per second is given by the following equation $H=W\log_2(1+S/N)$. This equation may be arranged in the form $$\frac{S}{N}=2\frac{W}{H}-1$$

The quantity $S/N$ represents the signal energy divided by the noise energy. The quality $W/H$ represents the bandwidth denoted by the informational rate which serves as a measure of the efficiency of the system in terms of frequency spectrum required. Thus, Curve 2000 of FIg. 15 is a plot of the Shannon limit. This curve represents a system with a zero error rate ($P$=0. As mentioned heretofore, several communication systems, including amplitude modulation, frequency modulation and phase modulation have been and can be utilized as a carrier in a transmission system. However, the type of carrier employed and the error rate of the transmission system are a function of the bandwidth per bit per second transmitted versus the energy required per bit divided by the noise power density. Curve 2002 illustrates the efficiency of a communication system utilizing a noncoherent detection system transmitting an error rate of ($P_e$=$10^{16}$ ). Curve 2004 illustrates a more efficient communication system which utilizes a coherent detection system. Curve 2006 illustrates the efficiency of a communication system which utilizes either single or double frequency modulation. It is apparent from Curve 2006 that the use of frequency modulation does not provide efficient frequency bandwidth operation. As the energy per bit divided by the noise power density is increased, the bandwidth per bit per second transmitted will also increase. Several unique systems have been designed to overcome specific disadvantages as set forth heretofore, and these include such systems as Kineplex, (Collins Radio Co.), coherent binary PCM, orthogonal codes and Digilock Systems (as described in a paper entitled "Digilock Telemetry System" by R. W. Sanders presented at the National Symposium on space Electronics and Telemetry at San Francisco, Calif., Sept. 28—30, 1959).

Each of the above systems, when operated in an error rate of $P_e$=$10^{16}$, becomes fairly efficient. As the bandwidth per bit per second transmitted decreases, the required energy per bit divided by the noise power density remains fairly low, which characteristics are desirable in a good communication system. However, Curve 2008 illustrates the approximate locus in which the inventive transmission system utilizing a balanced modulator is capable of being operated. At pertinent points such as A$^1$, B$^1$, C$^1$ and D$^1$, the efficiency of the inventive digital data transmission system at an error rate of $P$=$10^{16}$ is very near that of the ideal efficiency as illustrated by the Shannon Limit Curve. However, it is possible that two similar systems utilizing the inventive transmission system could be operated quadrature, that is the carrier signals for the two signals would be 90° out of phase. An example would be using sin $2\pi f_0t$ for one carrier signal and cos $2\pi f_0t$ for the other carrier. This would allow the two systems to use the same channel and thus double the bandwidth efficiency. When the systems are operated in quadrature, the locus is illustrated by curve 2010 and specifically pertinent points such as A, B, C and D.

Thus, the inventive transmission system, and the basic components thereof, discloses a new approach to efficiency in essentially error free transmission of digital data.

The above illustrative embodiment comprises a preferred embodiment of the invention. However, this illustration is not intended to limit the possibilities of using the features of the transmission system. The transmission system disclosed herein is an example of an arrangement in which the inventive features of this disclosure may be utilized and they will become apparent to one skilled in the art that certain modifications may be made within the spirit of the invention as defined by the appended claims.

I claim:

1. A data format conversion and transmission system, comprising:

a. a digital data encoder-transmitter for transmitting an input signal of digital data, the encoder-transmitter having a first matched filter to encode the input signal, the first matched filter including, b. a plurality of weighting impedances having the input signal applied thereon, the weighting impedances to weight the applied input signal;

c. a plurality of impulse response networks, each network having an input which is electrically connected to at least one of the weighting impedances to receive the weighted input signal, each impulse response network having an out response of $$\frac{\sin u(t-a)}{u(t-a)}$$

which output response appears in response to the received weighted input signal;

d. a bandwidth-limiting impulse response network having an output response of $$\frac{\sin u(t-a)}{u(t-a)}$$

electrically connected to the plurality of impulse response networks, for algebraically summing the plurality of output responses and producing a waveform having a plurality of sample points and which is representative of the input signal received by the matched filter;

e. a transmission channel, electrically coupled to the encoder-transmitter to receive the waveform, for propagating the received waveform;

f. a receiver-digital data decoder, electrically coupled to the transmission channel to receive the propagated waveform, the receiver-decoder having a second matched filter, the second matched filter including a bandwidth-limiting impulse response network, having an output response of $$\frac{\sin u(t-a)}{u(t-a)}$$

for receiving the propagated waveform and producing an output response when the waveform is received, g. a plurality of impulse response networks connected in parallel, the plurality of impulse response networks electrically connected to simultaneously receive the output response from the bandwidth-limiting impulse response network, each impulse response network having an output response of $$\frac{\sin u(t-a)}{u(t-a)}\text{; and}$$

h. a plurality of weighting impedances, electrically connected to the plurality of impulse response networks in an array to provide at least one weighting impedance in series with each impulse response network, each weighting impedance for receiving the output from its respective impulse response network and controlling the amplitude and polarity of the received output signal.

2. A data format conversion and transmission system comprising:

a. a digital data encoder-transmitter to receive an input signal of digital data, the encoder-transmitter having a first matched filter for encoding the input signal into a frequency bandwidth-limited electrical analog waveform having a plurality of discrete sample points, the amplitude of the waveform to be sampled at these sample points which are separated from each other by identical fixed time periods, the analog waveform being representative of the digital data;

b. a transmission channel electrically coupled to the encoder-transmitter to receive the analog waveform, the transmission channel for propogating the received waveform; and c. a receiver-digital data decoder electrically coupled to the transmission channel to receive the propogated analog waveform, the receiver-decoder having a second matched filter for decoding the waveform and correlating the amplitude of the waveform sampled at each of the sample points to produce an output of digital data conforming to the digital data applied as an input to the data format conversion and transmission system.

3. A data format conversion and transmission system comprising:

a. a digital data encoder-transmitter to receive an input signal of digital data, the encoder-transmitter for encoding the input signal into a frequency bandwidth-limited electrical analog waveform having a plurality of discrete sample points, the amplitude of the waveform to be sampled at these sample points which are separated from each other by identical fixed time periods, the analog waveform being representative of the digital data;

b. means for modulating the waveform with a carrier signal, electrically coupled to the encoder-transmitter;

c. means for linearly adding a plurality of phase-locking sine waves to the modulated waveform, the linear adding means being electrically coupled to the modulating means;

d. a frequency bandwidth-limited transmission channel electrically coupled to the linear adding means for receiving the modulated waveform and propogating the modulated waveform;

e. means for detecting the plurality of phase-locking sine waves linearly added to the propogated modulated waveform, electrically coupled to the frequency bandwidth-limited transmission channel, the detecting means becoming locked onto the linearly added phase-locking sine waves for producing a carrier signal and a pulse signal;

f. means for receiving and demodulating the waveform, electrically coupled to the frequency bandwidth-limited transmission channel and to the detecting means carrier signal, the demodulating means for demodulating the modulated signal to reproduce the waveform produced by the digital data encoder-transmitter;

g. a matched filter electrically coupled to the demodulation means to receive the propogated waveform;

h. a receiver-decoder, electrically coupled to the demodulation means to receive the propogated waveform and to the detecting means to receive the pulse signal, the receiver-decoder for correlating the amplitude of the waveform sampled at each of the sample points to produce an output of digital data conforming to the digital data applied at the input to the data format conversion and transmission system when conditioned by the pulse signal;

i. a decision circuit electrically coupled to the matched filter, the combination of the matched filter and the decision circuit operating to correlate the amplitude of the waveform at the sample points; and j. a register, electrically coupled to the decision circuit and to the detecting means, the register for receiving digital data conforming to the digital data applied at the input to the data format conversion and transmission system.

4. Data format and conversion system as set forth in claim 2 wherein the matched filters further comprise:

a. a plurality of impulse response networks, each network having an impulse output response of $$\frac{\sin u(t-a)}{u(t-a)}$$

b. a plurality of weighting and impedances electrically connected to the plurality of impulse response networks, the weighting impedances being electrically connected to weight the amplitude of the impulse output responses; and c. means for algebraically summing the weighted impulse output responses, the algebraic summing means to produce a waveform having a plurality of sample points which are the summed weighted impulse output responses.

5. A data format conversion and transmission system as set forth in claim 2 wherein the matched filters further comprise:

a. a first impulse response network having an output response of $$\frac{\sin u(t-a)}{u(t-a)}$$

to receive a single input pulse, the first network to produce its output response when an input pulse is received;

b. a plurality of secondary impulse response networks connected in parallel, the plurality of secondary impulse response networks electrically connected to simultaneously receive the output response from the first impulse response network, reach secondary impulse response network having an impulse output response of $$\frac{\sin u(t-a)}{u(t-a)}$$

which is produced when the first impulse response network's output response is received;

c. a plurality of weighting impedances electrically connected to the first and secondary impulse response networks in an array to provide at least one weighting impedance in series with each impulse response network, each weighting impedance for receiving the output from its respective impulse response network and controlling weighting the amplitude and polarity of the output; and d. means for algebraically summing the weighted outputs, the algebraic summing means electrically connected to the plurality of weighting impedance networks for receiving the weighted outputs and producing a waveform having a plurality of discrete sample points, the amplitude of the waveform at these points being the summed, weighted, output responses.